US009797616B2

(12) United States Patent
Furuta et al.

(10) Patent No.: US 9,797,616 B2
(45) Date of Patent: Oct. 24, 2017

(54) CONTROL METHOD FOR AIR CONDITIONER, AIR CONDITIONING CONTROL SYSTEM, NAVIGATION DEVICE, AND CONTROL DEVICE

(71) Applicant: Panasonic Intellectual Property Corporation of America, Torrance, CA (US)

(72) Inventors: Kazutaka Furuta, Osaka (JP); Toshihisa Nakano, Osaka (JP); Tsutomu Muraji, Nara (JP); Yasunori Ishii, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 225 days.

(21) Appl. No.: 14/654,958

(22) PCT Filed: May 2, 2014

(86) PCT No.: PCT/JP2014/002415
§ 371 (c)(1),
(2) Date: Jun. 23, 2015

(87) PCT Pub. No.: WO2014/188670
PCT Pub. Date: Nov. 27, 2014

(65) Prior Publication Data
US 2015/0338116 A1  Nov. 26, 2015

Related U.S. Application Data

(60) Provisional application No. 61/825,234, filed on May 20, 2013.

(51) Int. Cl.
*F24F 11/00* (2006.01)
*H04L 12/28* (2006.01)

(52) U.S. Cl.
CPC .......... *F24F 11/006* (2013.01); *F24F 11/001* (2013.01); *F24F 11/0086* (2013.01); *H04L 12/2818* (2013.01); *F24F 2011/0071* (2013.01)

(58) Field of Classification Search
CPC .... F24F 11/006; F24F 11/0086; F24F 11/001; F24F 2011/0071; H04L 12/2818
(Continued)

(56) References Cited

U.S. PATENT DOCUMENTS

2003/0004772 A1\* 1/2003 Dutta ..................... G06Q 10/02
718/100
2010/0289643 A1\* 11/2010 Trundle ............... F24F 11/0086
340/545.1
(Continued)

FOREIGN PATENT DOCUMENTS

JP  2001-264077  9/2001
JP  2003-74942   3/2003
(Continued)

OTHER PUBLICATIONS

International Search Report dated Aug. 12, 2014 in International (PCT) Application No. PCT/JP2014/002415.

*Primary Examiner* — Sean Shechtman
*Assistant Examiner* — Shon Foley
(74) *Attorney, Agent, or Firm* — Wenderoth, Lind & Ponack, L.L.P.

(57) ABSTRACT

A navigation device (100) estimates a time when a user utilizing the navigation device (100) comes home, and transmits the estimated expected arrival time to a control device (203) in association with the user identifier of the user. In response to receiving the expected arrival times from a plurality of the navigation devices (100), the control device (203) transmits, to an air conditioner (201), a reservation instruction for setting the room temperature at the home to a predetermined target temperature by the estimated arrival
(Continued)

time of the earliest user who is supposed to come home earliest. The air conditioner (201) is turned on in accordance with the transmitted reservation instruction among the users.

17 Claims, 15 Drawing Sheets

(58) Field of Classification Search
USPC .......................................................... 700/276
See application file for complete search history.

(56) References Cited

U.S. PATENT DOCUMENTS

2012/0125559 A1* 5/2012 Fadell .................. F24F 11/0012
165/11.2
2012/0303137 A1* 11/2012 Schoeller .............. H04L 12/282
700/1
2012/0319825 A1* 12/2012 Shimy ................. H04L 12/2818
340/12.5

FOREIGN PATENT DOCUMENTS

| JP | 2004-176936 | 6/2004 |
| JP | 2005-295160 | 10/2005 |
| JP | 2007-51799 | 3/2007 |
| JP | 2008-267741 | 11/2008 |
| JP | 2012-189427 | 10/2012 |

* cited by examiner

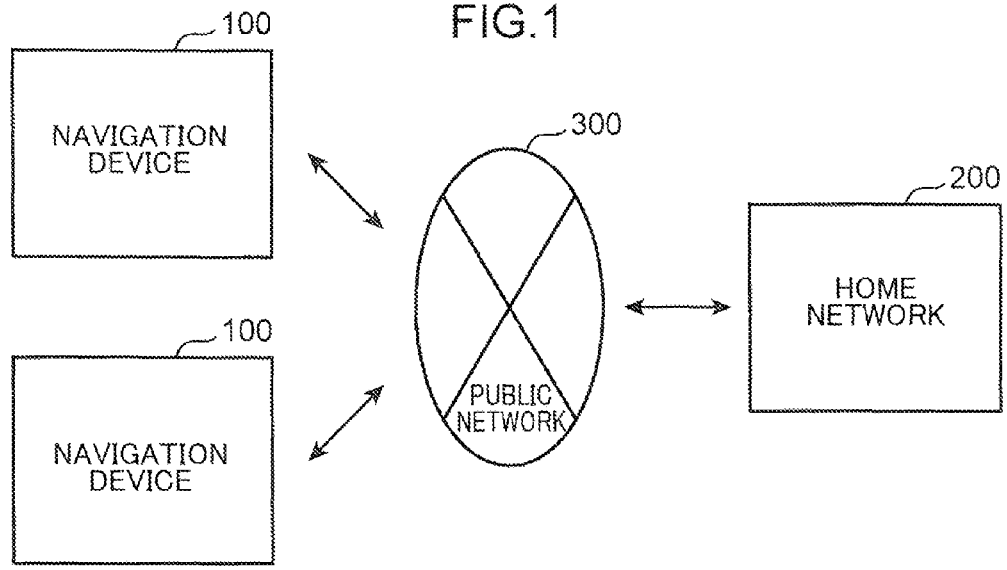
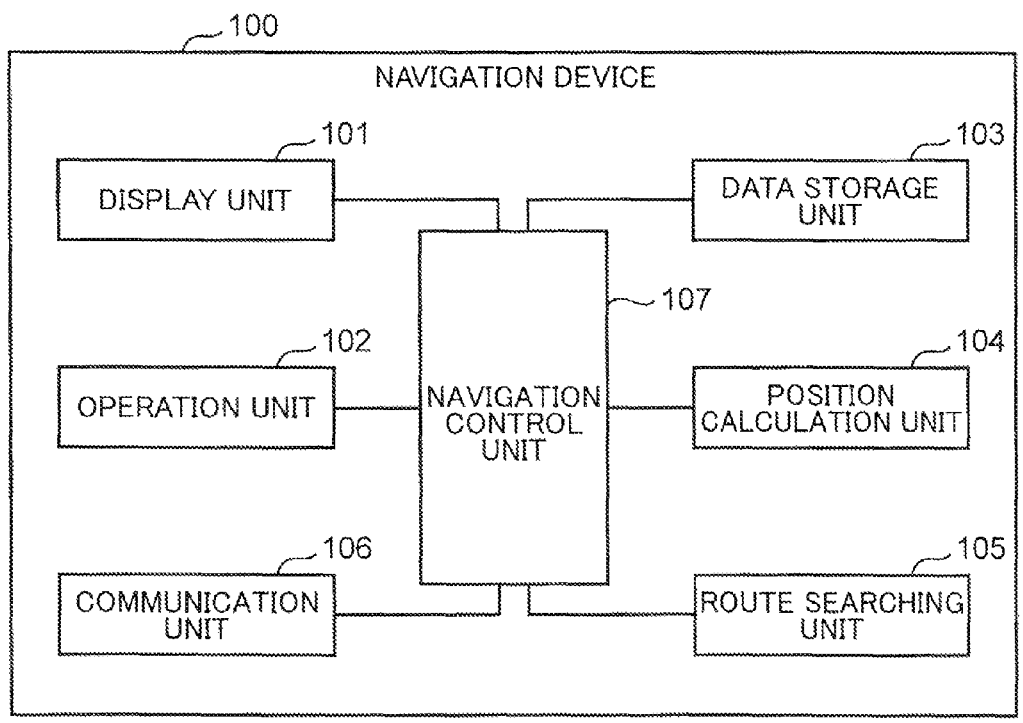

FIG.4

| USER ID | PREFERRED TEMPERATURE |
|---|---|
| 00000001 | 27 |
| 00000002 | 28 |
| 00000003 | 26 |
| 00000004 | 23 |
| 00000005 | 26 |
| 00000006 | 22 |

FIG.5

| USER ID | PREFERRED COOLING TEMPERATURE | PREFERRED WARMING TEMPERATURE |
|---|---|---|
| 00000001 | 27 | 20 |
| 00000002 | 28 | 23 |
| 00000003 | 26 | 20 |
| 00000004 | 23 | 18 |
| 00000005 | 26 | 22 |
| 00000006 | 22 | 20 |

| USER ID | PREFERRED TEMPERATURE | ROOM ID |
|---|---|---|
| 00000001 | 27 | 01 |
| 00000002 | 28 | 01,02 |
| 00000003 | 26 | 01,02 |
| 00000004 | 23 | 01 |
| 00000005 | 26 | 01,02,03 |
| 00000006 | 22 | 01 |

FIG.21

| DAY OF WEEK | 6:00 | 7:00 | 8:00 | 9:00 | ... | 20:00 | 21:00 | 22:00 | ... |
|---|---|---|---|---|---|---|---|---|---|
| MONDAY | 02 | 01 | — | — | ... | 01 | 01 | 02 | ... |
| TUESDAY | 02 | 01 | — | — | ... | 01 | 01 | 02 | ... |
| WEDNESDAY | 02 | 01 | — | — | ... | — | 01 | 02 | ... |
| THURSDAY | 02 | 01 | — | — | ... | — | 01 | 02 | ... |
| FRIDAY | 02 | 02 | 02 | 01 | ... | 01 | 02 | 02 | ... |
| SATURDAY | 02 | 02 | 02 | 01 | ... | 01 | 02 | 02 | ... |
| SUNDAY | 02 | 02 | 02 | 01 | ... | 01 | 02 | 02 | ... |

CONTROL METHOD FOR AIR CONDITIONER, AIR CONDITIONING CONTROL SYSTEM, NAVIGATION DEVICE, AND CONTROL DEVICE

TECHNICAL FIELD

The present disclosure relates to a technique of controlling an air conditioning device from a remote place.

BACKGROUND ART

Heretofore, an air conditioning device such as an air conditioner or an air cleaner is provided with a timer for operating the air conditioning device based on a user's intended time. For instance, in the case of an air conditioner, the user is allowed to turn on the air conditioner so that the room temperature of his/her home is set to a comfort temperature by his/her arrival time by setting the timer to turn on the air conditioner at an intended time such as 10 minutes earlier than the expected arrival time.

In a conventional air conditioning device provided with a timer, when the user wants to start an operation of the air conditioning device so that the room temperature is set to a comfort temperature by his/her arrival time, it is necessary for the user to estimate his/her arrival time before going out, and to set the timer to turn on the air conditioning device at a time slightly earlier than the estimated expected arrival time. However, when the user goes out by car, for instance, it is often the case that there is a time lag between the expected arrival time and the actual arrival time due to traffic jam or the like.

In view of the above, for instance, Patent Literature 1 discloses a technique, in which when the user receives an e-mail indicating that a preset expected arrival time is changed from the user's mobile information terminal, the preset expected arrival time is changed to operate the air conditioning device at a time earlier than the changed expected arrival time by a predetermined time.

Further, Patent Literature 2 discloses a technique, in which a navigation device for a vehicle issues an operation instruction to an air conditioning device in association with a navigation operation so as to control the operation state of the air conditioning device. More specifically, Patent Literature 2 discloses a technique, in which a navigation device sets a driving route to the place where the air conditioning device is installed, and issues, to the air conditioning device an operation instruction, taking into consideration an arrival timing at the installation place, assuming that the user drives the vehicle in accordance with the set driving route.

Further, Patent Literature 3 discloses the following technique. When the time has come to turn on an air conditioner installed at home, a query is issued to the user coming home as to whether the air conditioner is turned on. When the user chooses to turn on the air conditioner, the air conditioner is turned on. Further, when a cause of delay of the user's arrival is detected, a query is issued to the user as to whether activation of the air conditioner is stopped. When the user chooses to stop activation of the air conditioner, activation of the air conditioner is stopped.

None of the aforementioned techniques, however, is based on the premise that two or more users control an air conditioner installed at home from a place away from home. Thus, there is further room for improvement.

CITATION LIST

Patent Literature

Patent Literature 1: Japanese Unexamined Patent Publication No. 2003-74942
Patent Literature 2: Japanese Unexamined Patent Publication No. 2001-264077
Patent Literature 3: Japanese Unexamined Patent Publication No. 2012-189427

SUMMARY OF INVENTION

An air conditioning device control method according to an aspect of the present disclosure is an air conditioning device control method for use in an air conditioning control system provided with a navigation device which guides a user home, a control device which controls an air conditioning device installed at the home, and the air conditioning device, wherein the navigation device estimates a time when the user utilizing the navigation device comes home, and transmits the estimated expected arrival time to the control device in association with a user identifier of the user;

the control device, in response to receiving the expected arrival times from a plurality of the navigation devices, transmits, to the air conditioning device, a reservation instruction for setting a room temperature at the home to a predetermined target temperature at an expected arrival time of an earliest user who is supposed to come home earliest among the users; and the air conditioning device is turned on in accordance with the transmitted reservation instruction.

BRIEF DESCRIPTION OF DRAWINGS

FIG. 1 is a diagram illustrating an overall configuration of an air conditioning control system in a first embodiment of the invention;

FIG. 2 is a block diagram illustrating a practical configuration of a navigation device in the first embodiment of the invention;

FIG. 4 is a diagram illustrating a data configuration of management data to be stored in an information storage unit;

FIG. 5 is a diagram illustrating another example of the management data;

FIG. 13 is a diagram illustrating an activation notification screen to be displayed on the navigation device when the air conditioner is actually turned on;

FIG. 15 is a diagram illustrating an activation notification screen to be displayed on the navigation device when the air conditioner is manually turned on;

FIG. 21 is a diagram illustrating a data configuration of behavior pattern data in the third embodiment.

Figure 3:
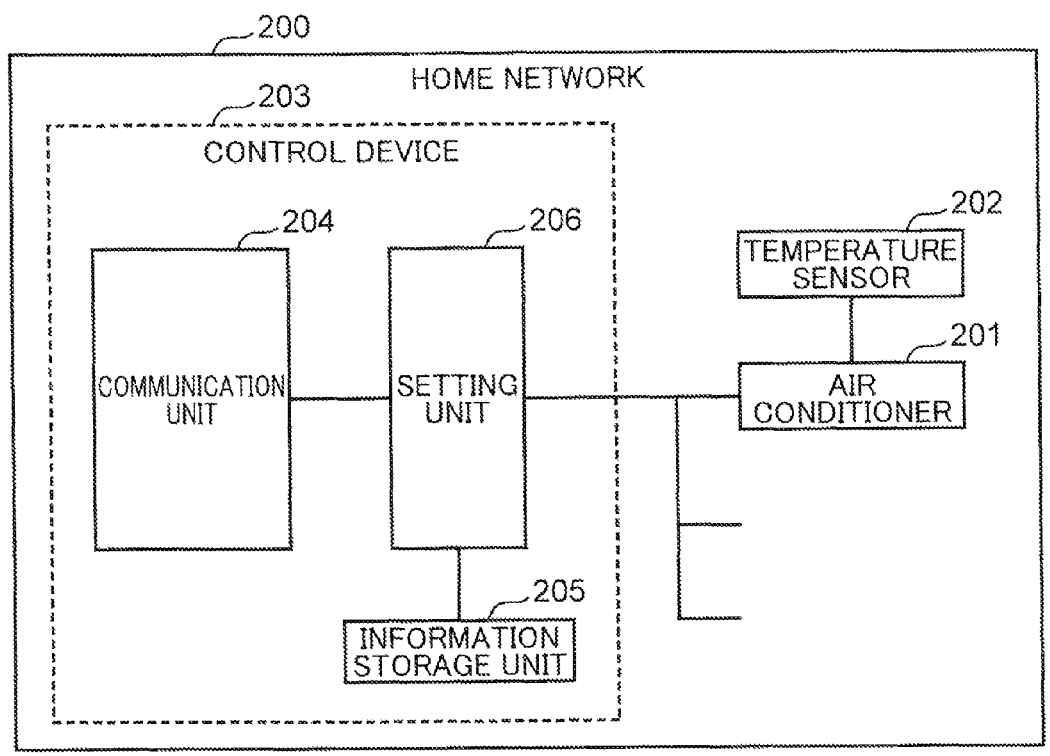
FIG. 3 is a block diagram illustrating a practical configuration example of a home network in the first embodiment of the invention.

DESCRIPTION OF EMBODIMENTS (Findings Based on which the Invention has been Made)

Heretofore, there have been developed many techniques, in which the user remote controls household electrical appliances when the user is away from home. For instance, there is known a technique, in which a user's mobile phone is connected to an air conditioner via a communication line, and the user is allowed to set an intended temperature by way of the mobile phone so as to operate the household electrical appliance (see Patent Literature 1). In this technique, however, the user is required to perform a cumbersome operation each time the user uses the mobile phone.

Further, there is known a technique, in which the user is allowed to issue an instruction to start an operation of an air conditioning device at a time earlier than the expected arrival time by a predetermined time, or at a time when the user's distance from home is within a predetermined distance by setting an activation condition in advance (see Patent Literature 2). According to this technique, it is possible to automatically turn on the air conditioner when the user is coming home. In this technique, however, there is no consideration about the room temperature at home or a set temperature of the air conditioner. As a result, the room may be uselessly cooled, or the room temperature may not be an appropriate temperature when the user comes home. Further, the user is required to set the time or the distance intuitively. This may be cumbersome.

Further, there is known a technique, in which a screen prompting the user to turn on the air conditioner is displayed on the user's navigation device when the user's distance from home is within a predetermined distance; or a screen prompting the user to turn off the air conditioner is displayed on the user's navigation device when the expected arrival time may be delayed due to traffic jam or the like (see Patent Literature 3). This technique, however, is not based on the premise that two or more users control an air conditioner installed at home when the users are away from home. As a result, when a certain user is away from home, and another user is coming home, a screen prompting the user to confirm whether to turn on or turn off the air conditioner may be displayed on the navigation device at an unexpected timing.

In view of the above, an object of the present disclosure is to solve the aforementioned problems, and more particularly, to provide a technique capable of operating an air conditioning device at an appropriate temperature by the user's arrival time.

In order to solve the aforementioned drawbacks, an air conditioning device control method according to an aspect of the present disclosure is an air conditioning device control method for use in an air conditioning control system provided with a navigation device which guides a user home, a control device which controls an air conditioning device installed at the home, and the air conditioning device, wherein the navigation device estimates a time when the user utilizing the navigation device comes home, and transmits the estimated expected arrival time to the control device in association with a user identifier of the user;

the control device, in response to receiving the expected arrival times from a plurality of the navigation devices, transmits, to the air conditioning device, a reservation instruction for setting a room temperature at the home to a predetermined target temperature by an expected arrival time of an earliest user who is supposed to come home earliest among the users; and the air conditioning device is turned on in accordance with the transmitted reservation instruction.

According to the aforementioned configuration, even when two or more users are coming home, and expected arrival times are transmitted from two or more navigation devices, a reservation instruction is transmitted to the air conditioning device based on the expected arrival time of the earliest user. Thus, it is possible to prevent a failure that the room temperature at home does not reach a target temperature when the earliest user comes home.

In the aforementioned configuration, when the expected arrival time is changed, the navigation device may transmit the changed expected arrival time to the control device in association with the user identifier, and the control device may update the expected arrival time of the earliest user, using the transmitted changed expected arrival time.

According to the aforementioned configuration, even when the expected arrival time is changed due to traffic jam or the like, it is possible to control the activation timing and the set temperature of the air conditioning device at home based on the changed expected arrival time.

In the aforementioned configuration, the control device may determine, as the target temperature, an intended temperature set by the earliest user, using management data, in which user identifiers of the users and intended temperatures of the air conditioning device set by the users are associated with each other.

According to the aforementioned configuration, it is possible to set the room temperature to the preferred temperature of the earliest user when the earliest user comes home.

In the aforementioned configuration, the management data may further include registered room identifiers for identifying rooms at the home where the users use the air conditioning devices, and the control device may determine the room where the earliest user is supposed to stay, using the management data, and may transmit the reservation instruction to the air conditioning device installed in the determined room.

According to the aforementioned configuration, it is possible to set the room temperature of the room where the earliest user is supposed to stay to the preferred temperature of the earliest user when the earliest user comes home. This makes it possible to set the temperature of the user's room to the preferred temperature of the user, without the user's input operation of designating the room where the user is supposed to stay.

In the aforementioned configuration, the control device may specify the room where the earliest user is supposed to stay at the expected arrival time of the earliest user, using behavior pattern data indicating which user stays in which room at the home during each time zone, and may transmit the reservation instruction to the air conditioning device installed in the specified room.

According to the aforementioned configuration, the user is allowed to reserve activation of an intended air conditioning device, without an operation of designating the room where the user is supposed to stay at the expected arrival time.

In the aforementioned configuration, when the reservation instruction is transmitted to the air conditioning device, the control device may notify the navigation device of the earliest user, of setting notification including the expected arrival time of the earliest user and the target temperature.

According to the aforementioned configuration, the navigation device of the earliest user is notified of the setting notification including the expected arrival time and the target temperature. This makes it possible to notify the earliest user on the way back home that activation of the air conditioning device is reserved based on the expected arrival time of the earliest user.

In the aforementioned configuration, when the reservation instruction is transmitted to the air conditioning device, the control device may notify the navigation device of a user other than the earliest user, of setting notification including the expected arrival time of the earliest user and the target temperature.

According to the aforementioned configuration, the navigation device of the other user is notified of the setting notification including the expected arrival time of the earliest user and the target temperature. This makes it possible to notify the other user on the way back home that activation of the air conditioning device is reserved based on the expected arrival time of the earliest user.

The control device may monitor an operation state of the air conditioning device, and when a change in the operation state is detected, the control device may transmit state change notification indicating the change to the navigation device.

According to the aforementioned configuration, the user is allowed to confirm a change in the operation status of the air conditioning device installed at home.

After the reservation instruction is transmitted, when a change in the room temperature at the home is detected by a temperature sensor for measuring the room temperature, and an activation time of the air conditioning device is changed by the air conditioning device, the control device may transmit, to the navigation device, change notification including the detected temperature, the changed activation time, and the target temperature.

According to the aforementioned configuration, when the room temperature changes, and the air conditioner changes the activation timing and the set temperature, the navigation device is notified accordingly. This allows for the earliest user and the other user to recognize the fact of change.

When the reservation instruction is transmitted, if a temperature difference between the room temperature at the home detected by a temperature sensor for measuring the room temperature, and the target temperature exceeds a predetermined allowable value, the control device may notify the navigation device of disable notification indicating that it is impossible to set the target temperature by the expected arrival time of the earliest user.

According to the aforementioned configuration, the user on the way back home is notified that it is impossible to set the room temperature to the target temperature by the expected arrival time of the earliest user. This alleviates the earliest user from stress that the room temperature is not set to the target temperature when the earliest user comes home.

In response to receiving the setting notification, the navigation device may cause a display device to display a confirmation screen for allowing the user to choose whether to cancel activation reservation of the air conditioning device, and in response to the user's choosing the activation reservation cancellation, cancellation notification may be transmitted to the control device, and in response to receiving the cancellation notification, the control device may determine the earliest user from among the users other than the user who cancels the activation reservation.

According to the aforementioned configuration, when the user who is notified of the changed activation timing and the changed set temperature determines to prioritize reservation of the other user, the user is allowed to cancel activation reservation by himself or herself. Thereafter, it is possible for the user to choose the earliest user from among the users except for the user.

In the aforementioned configuration, in response to receiving the state change notification, the navigation device may cause a display device to display a confirmation screen for allowing the user to choose whether to stop activation of the air conditioning device, and in response to the user's choosing to stop activation, an activation stop instruction may be transmitted to the control device, and in response to receiving the activation stop instruction, the control device may stop activation of the air conditioning device.

According to the aforementioned configuration, the user is allowed to turn on or turn off the air conditioning device, as necessary. For instance, when a family member other than the user comes home, and turns on the power of the air conditioning device in a state that activation reservation of the air conditioning device is valid, it is possible to invalidate the activation reservation. Further, when the expected arrival time approaches, and a family member who comes home turns off the air conditioning device when the air conditioning device is under operation, the user on the way back home is allowed to turn on the power of the air conditioning device again. Further, the aforementioned configuration is advantageous in reducing energy consumption of the air conditioning device.

In the aforementioned configuration, in response to receiving the change notification, the control device may cause a display device to display a confirmation screen for allowing the user to choose whether to cancel activation reservation of the air conditioning device, and in response to the user's choosing the activation reservation cancellation, cancellation notification may be transmitted to the control device, and in response to receiving the cancellation notification, the control device may determine the earliest user from among the users other than the user who cancels the activation reservation.

According to the aforementioned configuration, when the user who is notified of the changed activation timing and the changed set temperature determines to prioritize reservation of the other user, the user is allowed to cancel activation reservation by himself or herself. Thereafter, it is possible for the user to choose the earliest user from among the users except for the user.

In response to receiving the disable notification, the navigation device may cause a display device to display a confirmation screen for allowing the user to choose whether to cancel activation reservation of the air conditioning device, and in response to the user's choosing the activation reservation cancellation, cancellation notification may be transmitted to the control device, and in response to receiving the cancellation notification, the control device may determine the earliest user from among the users other than the user who cancels the activation reservation.

According to the aforementioned configuration, when the user who is notified that it is impossible to set the room temperature to the target temperature by the expected arrival time of the earliest user determines to prioritize reservation of the other user, the user is allowed to cancel activation reservation by himself or herself. Thereafter, it is possible for the user to choose the earliest user from among the users except for the user.

The following embodiments are examples of the invention. The numerical values, the shapes, the constituent elements, the steps, and the order of steps described in the following embodiments are examples, and do not limit the gist of the invention. Further, among the constituent elements in the following embodiments, the constituent elements that are not described in independent claims defining the broadest scope are described as optional constituent elements. Further, it is possible to combine each of the contents in all the embodiments.

First Embodiment

FIG. 1 is a diagram illustrating an overall configuration of an air conditioning control system in a first embodiment of the invention. The air conditioning control system includes navigation devices 100 and a home network 200. Examples of the navigation devices 100 are a car navigation system to be loaded in a vehicle, and a smartphone loaded with a navigation function. Further, the home network 200 is a network to which an air conditioning device such as an air conditioner or a dehumidifier, and a cooking device such as a rice cooker or a microwave oven installed at home are connected. Examples of a public network 300 are a communication network of mobile phones, and a communication, network such as a wireless LAN. The public network 300 connects between the navigation devices 100 and the home network 200.

According to the aforementioned configuration, the navigation devices 100 are connected to the home network 200 via the public network 300 for transmitting/receiving information. In FIG. 1, two navigation devices 100 are illustrated. However, the number of navigation devices is not limited to two. In FIG. 1, three or more navigation devices 100 may be connected to the home network 200 via the public network 300. For instance, one of the family members may connect a navigation device 100 loaded in a vehicle to the home network 200 via the public network 300, and another family member may connect a navigation device 100 i.e. a smartphone loaded with a navigation function to the home network 200 via the public network 300.

According to this configuration, the user is allowed to operate an air conditioning device such as an air conditioner installed at a remote place but within the home network 200 by operating the navigation device 100. Further, it is possible to notify the user's navigation device 100 of the information relating to the air conditioning device such as an air conditioner within the home network 200.

In the example illustrated in FIG. 1, the navigation devices 100 and the home network 200 are connected via the public network 300. The embodiment is not limited to the aforementioned configuration. For instance, a server may be disposed in the public network 300, the navigation devices 100 may be connected to the server, and the server may be connected to the home network 200. Further alternatively, the home network 200 may be connected to the server, and the server may be connected to the navigation devices 100.

Next, a flow of information in the air conditioning control system is described.

FIG. 2 is a block diagram illustrating a practical configuration of the navigation device 100 in the first embodiment of the invention. The navigation device 100 is provided with a display unit 101, an operation unit 102, a data storage unit 103, a position calculation unit 104, a route searching unit 105 (an example of an estimation unit), and a communication unit 106 (an example of a first communication unit).

The display unit 101 is constituted of e.g. a liquid crystal display or an organic EL display, and is configured to display various information. For instance, the display unit 101 displays various information such as icons, cursors, menus, windows, characters, images, and videos.

The operation unit 102 is used for operating an air conditioner in the home network 200, for instance, in addition to the navigation device 100. For instance, the operation unit 102 is constituted of physical operation buttons or a microphone for voice input. Further, the operation unit 102 may be constituted of a touch display configured such that the user touches the surface of the display unit 101 to convey his/her intention.

The data storage unit 103 is constituted of a hard disk or a memory, and is configured to store various data. For instance, the data storage unit 103 stores identifiers for identifying the users, and map data including information relating to roads and facilities. The map data includes data such as link data relating to roads, node data, and search data for use in searching a route. Further, the map data includes information such as home addresses and office addresses of the users, and information such as the names and addresses of frequently used shops/facilities.

The position calculation unit 104 calculates the current position of the navigation device 100, using information such as GPS satellite information or radio wave information. The calculated current position serves as the current position of the user utilizing the navigation device 100.

The route searching unit 105 searches a route from the current position to a destination, using the map data stored in the data storage unit 103. Then, the route searching unit 105 estimates an expected arrival time when the user is expected to arrive the destination, using the searched route. Setting the user's home stored in the data storage unit 103 as a destination allows for the user to instruct the navigation device 100 to search a route from the current position to home at any time, and to estimate the expected arrival time at home. In this example, the route searching unit 105 may search a route, using an algorithm such as an A*algorithm or a Dijkstra algorithm.

It is not necessarily required to store the map data in the data storage unit 103. For instance, it is possible to store the map data in a server disposed at a remote place, and to receive the map data by the navigation device 100 via the public network 300. The communication unit 106 communicates with another device or the network via the public network 300. A navigation control unit 107 is configured to control the overall operation of the navigation device. For instance, the navigation control unit 107 controls the display unit 101 to display a screen such that a route from the current position calculated by the route searching unit 105 to home is overlapped on a map screen for displaying a region in the vicinity of the current position calculated by the position calculation unit 104.

FIG. 3 is a block, diagram illustrating a practical configuration example of the home network 200 in the first embodiment of the invention.

Household electrical appliances such as a rice cooker and a television receiver exist in the home network 200, in addition to an air conditioning device such as an air conditioner 201 and a dehumidifier. FIG. 3 illustrates the air conditioner 201, as a representative example of the air conditioning device. This is merely an example. The air conditioning device is not limited to the air conditioner 201, but may be a dehumidifier, an air cleaner, or a humidifier. Further, the air conditioner 201 is provided with a temperature sensor 202 for measuring a room temperature, and is configured to perform appropriate air conditioning control based on the room temperature measured by the temperature sensor 202, and the temperature designated by the user. The temperature sensor 202 may not be necessarily provided in the air conditioner 201. For instance, the temperature sensor 202 may be provided in a control device 203, and the air conditioner 201 may communicate with the control device 203 to acquire a temperature detected by the temperature sensor 202.

The control device 203 is also provided with a function of communicating with the navigation device 100 connected to the public network 300, in addition to the function of controlling an air conditioning device and the other household electrical appliances. The control device 203 may be a gateway or a home server, for instance.

The control device 203 is provided with a communication unit 204, an information storage unit 205, and a setting unit 206. For instance, the communication unit 204 is constituted of a communication device for connecting the control device 203 to the public network 300. In the embodiment, in particular, the communication unit 204 communicates with the navigation devices 100. The information storage unit 205 is constituted of a memory such as an RAM or an SD card, or a hard disk; and is configured to store information relating to the users. The information storage unit 205 stores, as the information relating to the users, at least user identifiers for identifying the users, and preferred temperatures of the users.

The setting unit 206 communicates with the navigation device 100, using the communication unit 204, and receives a user's expected arrival time to be transmitted from the navigation device 100 in association with a user identifier. The setting unit 206 transmits, to the air conditioner, 201, a reservation instruction including a preferred temperature of the user stored in the information storage unit 205 and the expected arrival time transmitted from the navigation device 100. The air conditioner 201 sets an activation timing and a set temperature, so that the room temperature at home reaches the preferred temperature of the user by the expected arrival time indicated by the received reservation instruction. In other words, a reservation instruction to be transmitted by the control device 203 is a command for setting the room temperature at the user's home to the user's preferred room temperature at the user's expected arrival time.

FIG. 4 is a diagram illustrating a data configuration of management data to be stored in the information storage unit 205. FIG. 4 is an example of most simplified management data, wherein "USER ID" (an example of a user identifier) for identifying the user, and "PREFERRED TEMPERATURE" are associated with each other.

The user whose user ID is registered is, for instance, a person living at home where the air conditioner 201 is installed. Preferred temperatures of users are registered in the management data individually. Therefore, the control device 203 is capable of operating the air conditioner 201 in such a manner that the room temperature at home reaches the preferred temperature of a certain user by the expected arrival time of the user. In this example, "PREFERRED TEMPERATURE" registered in the management data may be a temperature input by the user in advance, or may be a temperature calculated from log information indicating an operation history of the air conditioner 201.

Specifically, the air conditioner 201 may be configured such that when the air conditioner 201 is operated, the air conditioner 201 specifies the user operating the air conditioner 201, and may generate log information by associating the user ID of the specified user, and information set by the user's operation (e.g. the set temperature in the cooling mode is 25° C.). A method for specifying the user by the air conditioner 201 may be a fingerprint authentication method, a method in which the user is allowed to input the user ID, a face authentication method, or a voice authentication method. The air conditioner 201 may transmit the generated log information to a device managing the log information (e.g. a cloud server or the control device 203).

It is not necessarily required to store preferred temperatures of users in management data. The control device 203 may transmit a preferred temperature without including the preferred temperature in a reservation instruction. When it is determined that a received reservation instruction does not include a preferred temperature, the air conditioner 201 may set an activation timing and a set temperature so that the room temperature reaches a predetermined target temperature by the expected arrival time.

FIG. 5 is a diagram illustrating another example of management data. In the example illustrated in FIG. 5, "PREFERRED TEMPERATURE" is classified and registered into "PREFERRED COOLING TEMPERATURE" indicating preferred temperatures in the cooling mode, and "PREFERRED WARMING TEMPERATURE" indicating preferred temperatures in the warming mode. In this case, the control device 203 may transmit, to the air conditioner 201, a reservation instruction including "PREFERRED COOLING TEMPERATURE" and "PREFERRED WARMING TEMPERATURE". In response to receiving the reservation instruction, the air conditioner 201 switches between the cooling mode and the warming mode, based on the external temperature or based on the room temperature. When the air conditioner 201 is operated in the cooling mode, the air conditioner 201 may set the temperature designated by "PREFERRED COOLING TEMPERATURE". When the air conditioner 201 is operated in the warming mode, the air conditioner 201 may set the temperature designated by "PREFERRED WARMING TEMPERATURE".

Figure 6:
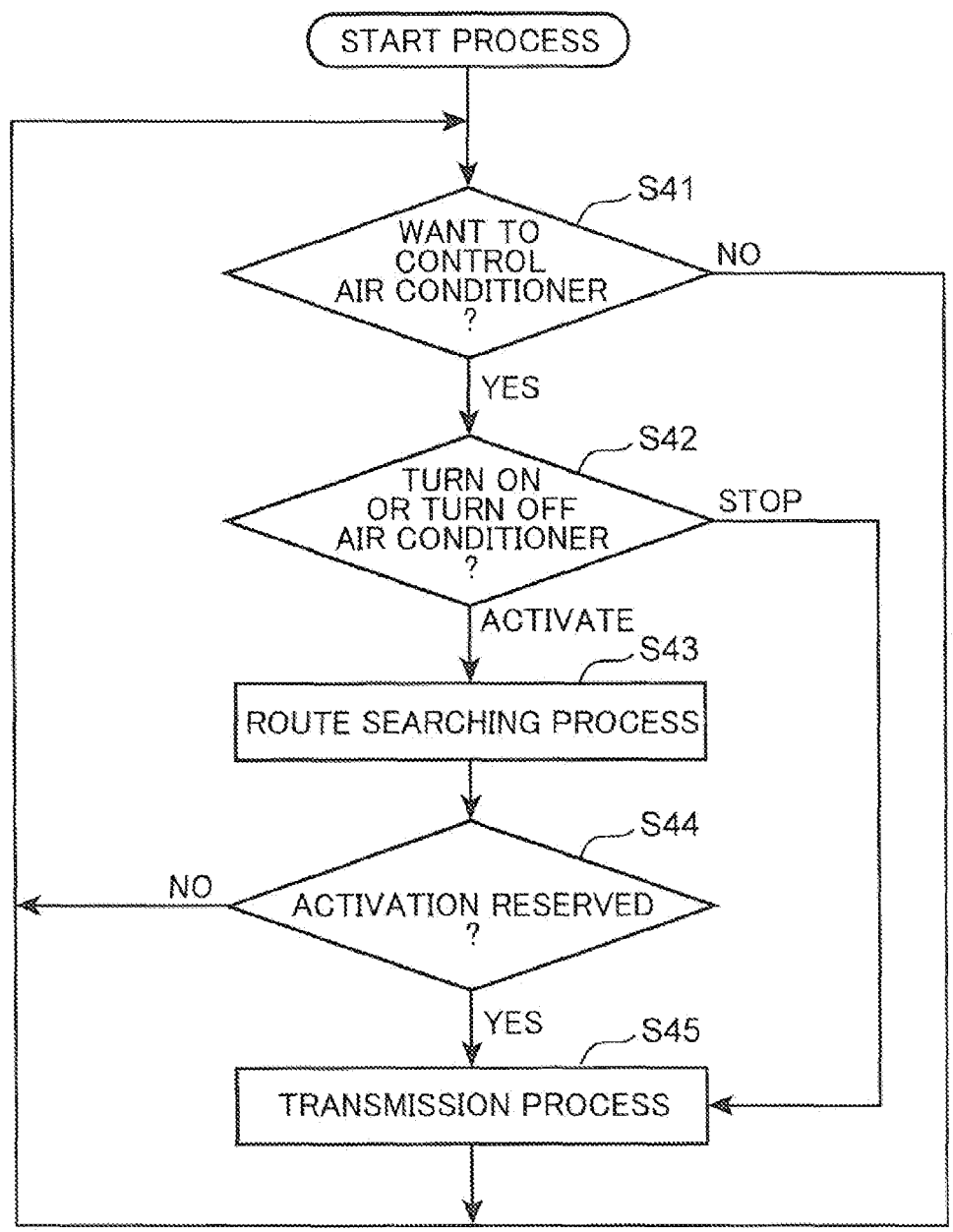
FIG. 6 is a flowchart illustrating an example of a process to be performed when the navigation device transmits an expected arrival time to the home network.

FIG. 6 is a flowchart illustrating an example of a process, when the navigation device 100 transmits an expected arrival time to the home network 200. The user operates the operation unit 102 provided in the navigation device 100 to transmit the expected arrival time.

First of all, the navigation control unit 107 of the navigation device 100 monitors whether a user's input operation with respect to the operation unit 102 has been performed (Step S41). When a user's input operation with respect to the operation unit 102 indicating that the user wants to reserve activation of the air conditioner 201 installed at home is detected (YES in Step S41), the navigation control unit 107 controls the display unit 101 to display an instruction screen 902 for allowing the user to input activation reservation information illustrated in FIG. 7. In this example, the navigation control unit 107 may determine YES in Step S41, when a user's operation of pressing a predetermined button included in the operation unit 102 is detected.

Figure 7:
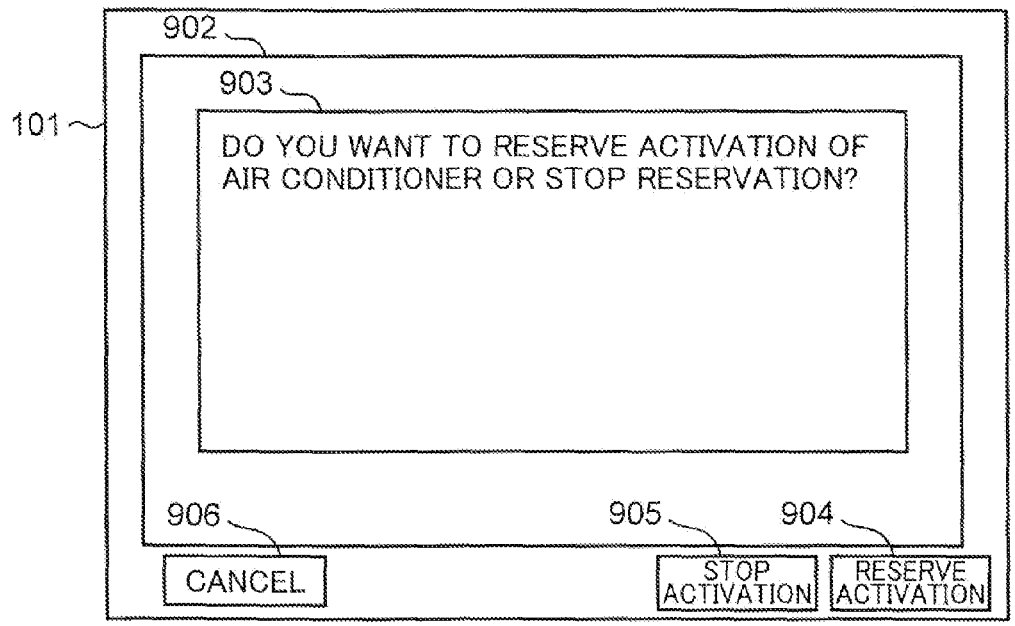
FIG. 7 is a diagram illustrating an instruction screen to be displayed on the navigation device when a user inputs information relating to activation reservation of an air conditioner.

FIG. 7 is a diagram illustrating the instruction screen 902 to be displayed on the navigation device 100, when the user inputs activation reservation information of the air conditioner 201. The instruction screen 902 is also used when the user wants to stop activation reservation of the air conditioner 201, after the user reserved activation of the air conditioner 201.

In FIG. 7, the instruction screen 902 includes a display column 903 for displaying a message prompting the user to turn on or turn off the air conditioner 201. For instance, the display column 903 displays a message "DO YOU WANT TO RESERVE ACTIVATION OF AIR CONDITIONER OR STOP RESERVATION?". When the user inputs an instruction to reserve activation of the air conditioner 201, the user touches an icon 904 indicating "RESERVE ACTIVATION". Further, when the user wants to stop activation reservation of the air conditioner 201, after the user reserved activation, the user touches an icon 905 indicating "STOP ACTIVATION" to input an instruction to stop activation reservation. An icon 906 indicating "CANCEL" is an icon to be chosen when the user cancels an operation with respect to the instruction screen 902.

Figure 8:
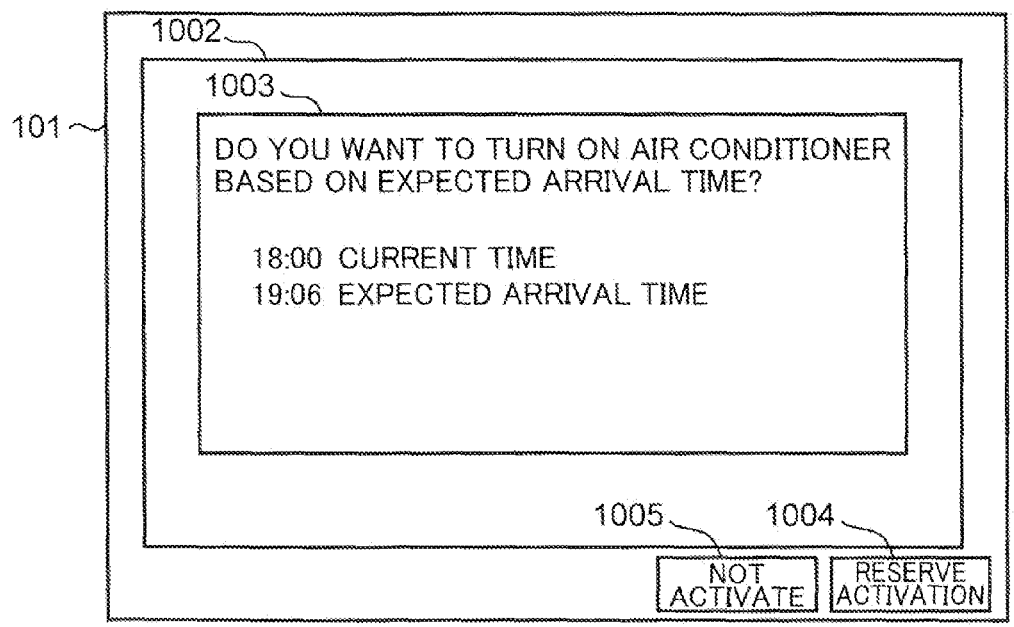
FIG. 8 is a diagram illustrating a confirmation screen.

Subsequently, when the user touches an icon 904 to choose activation reservation ("ACTIVATE" in Step S42), the navigation control unit 107 controls the route searching unit 105 to search a route from the current position calculated by the position calculation unit 104 to the home stored in the data storage unit 103, and an expected arrival, time (Step S43). When the searching process is finished, the navigation control unit 107 controls the display unit 101 to display a confirmation screen 1002 prompting the user to confirm whether to turn on the air conditioner 201, as illustrated in FIG. 8. FIG. 8 is a diagram illustrating the confirmation screen 1002. The confirmation screen 1002 includes a confirmation contents display column 1003 for displaying the confirmation contents to the user. The confirmation contents display column 1003 displays, for instance, a message "DO YOU WANT TO TURN ON AIR CONDITIONER BASED ON EXPECTED ARRIVAL TIME?" together with the current time attached with a caption "CURRENT TIME" and the expected arrival time attached with a caption "EXPECTED ARRIVAL TIME". The expected arrival time is an expected arrival time calculated by the route searching unit 105.

In the display area of the display unit 101, an icon 1005 indicating "NOT ACTIVATE", and an icon 1004 indicating "RESERVE ACTIVATION" are displayed at a position below the confirmation screen 1002.

When the user intends to input reservation information to activate the air conditioner 201, the user touches the icon 1004. When the user does not want to reserve activation of the air conditioner 201, the user touches the icon 1005. Thus, the user is allowed to input his/her intention to the navigation device 100.

When the user touches the icon 1004, and it is detected that activation reservation is chosen (YES in Step S44), the navigation control unit 107 transmits, to the home network 200, the user ID stored in the data storage unit 103, and the expected arrival time calculated in Step S43, using the communication unit 106 (Step S45). According to this control, the user is allowed to set activation reservation of the air conditioner 201, without an operation of estimating the expected arrival time at home.

On the other hand, when the user touches the icon 1005, and it is detected that stopping activation reservation is chosen (NO in Step S44), the process returns to Step S41.

Further, in Step S42, when the user touches the icon 905 on the instruction screen 902, and it is detected that stopping activation reservation is chosen ("STOP" in Step S42), the navigation control unit 107 transmits, to the home network 200, the user ID stored in the data storage unit 103, and a stop instruction for stopping activation reservation, using the communication unit 106 (Step S45). According to this control, the user is allowed to stop activation reservation that has been set.

Figure 9:
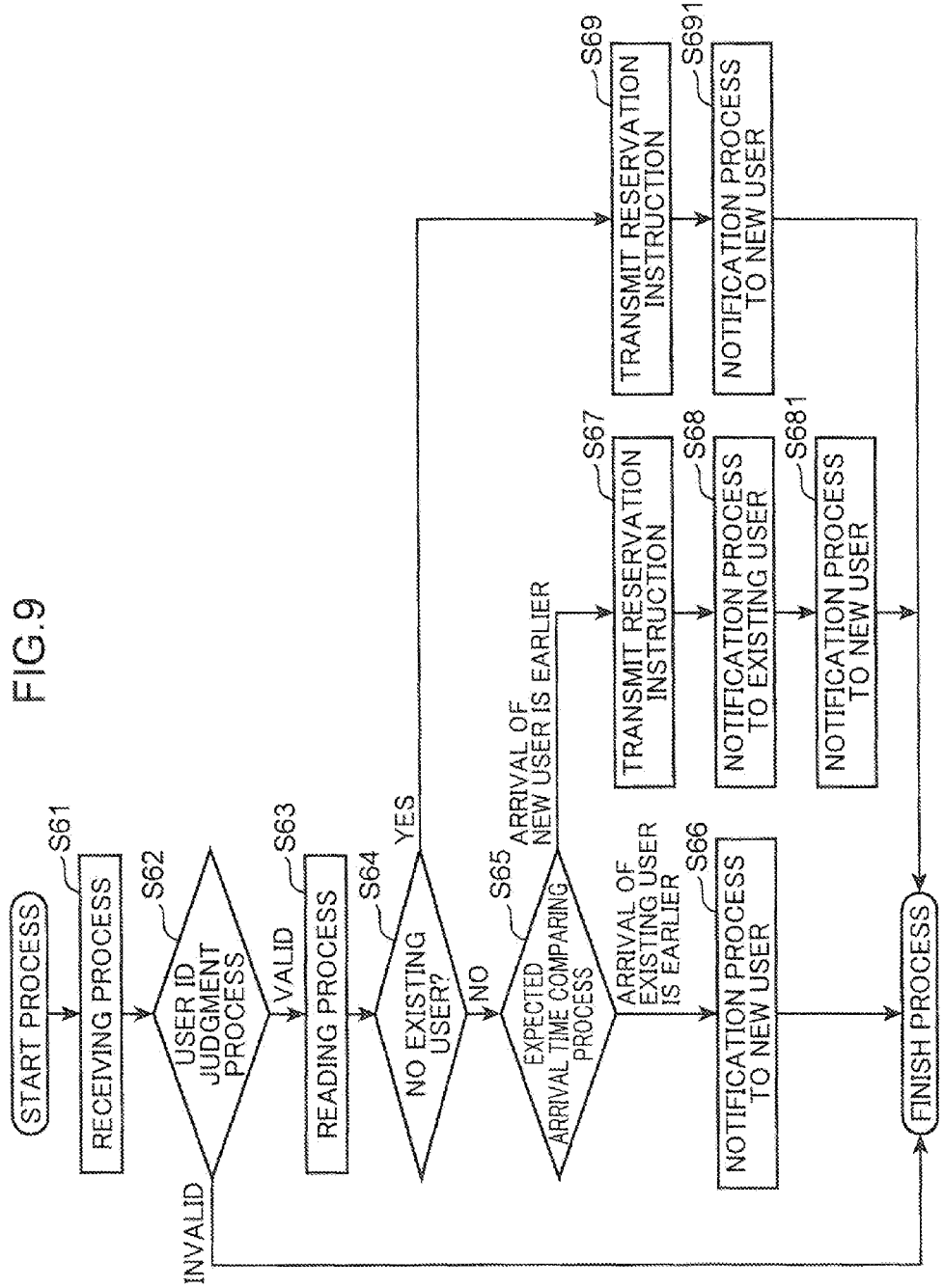
FIG. 9 is a flowchart illustrating a process of the home network, following the flowchart of the navigation device illustrated in FIG. 6.

FIG. 9 is a flowchart illustrating a process of the home network 200, following the flowchart of the navigation device 100 illustrated in FIG. 6. FIG. 9 illustrates an example, in which the user touches the icon 1004 illustrated in FIG. 8, and an expected arrival time is transmitted from the navigation device 100.

The setting unit 206 of the control device 203 receives the user ID and the expected arrival time of the user (hereinafter, to simplify the description, called as a "new user") from the navigation device 100 via the communication unit 204 (Step S61). Subsequently, the setting unit 206 compares the user ID of the new user, and the user ID stored in the information storage unit 205 (Step S62). When the user ID of the new user matches one of the user IDs stored in advance in the information storage unit 205 ("VALID" in Step S62), the setting unit 206 judges that the use ID is a valid user ID.

Subsequently, the setting unit 206 reads the information relating to the new user from the information storage unit 205 (Step S63). The setting unit 206 may read the preferred temperature of the new user registered in the management data illustrated in FIG. 4 or in FIG. 5. In this example, the setting unit 206 reads a preferred temperature. The invention is not limited to the above. As far as preferred humidity data is registered in the management data, a preferred humidity may be read. The same idea is also applicable to a case, in which management data illustrated in FIG. 19 to be described later is used.

On the other hand, in Step S62, when the user ID of the new user does not match any one of the user IDs stored in advance in the information storage unit 205 ("INVALID" in Step S62), the setting unit 206 determines that the user ID is not a valid user ID, and finishes the process.

Next, when there is no user (hereinafter, to simplify the description, called as "existing user") whose user ID and expected arrival time have already been received, and there only exists a new user (YES in Step S64), the setting unit 206 transmits, to the air conditioner 201, a reservation instruction including the preferred temperature and the expected arrival time of the new user (Step S69).

In this case, the air conditioner 201 determines the activation timing of the air conditioner 201 and the set temperature of the air conditioner 201 in such a manner that the room temperature reaches the preferred temperature of the new user by the expected arrival time of the new user, and reserves activation of the air conditioner 201. Specifically, the air conditioner 201 estimates the room temperature at the expected arrival time of the new user. In this example, to simplify the description, the room temperature is equal to the current room temperature measured by the temperature sensor 202. Then, the air conditioner 201 calculates a temperature difference between the room temperature measured by the temperature sensor 202, and the preferred temperature of the new user. For instance, when the preferred temperature of the new user is set, the air conditioner 201 calculates a time required for the room temperature to rise by the calculated temperature difference. In this example, the air conditioner 201 may store a table, in which the increase rate of the room temperature is set in advance with respect to each set temperature, determine the increase rate of the room temperature in association with the set temperature by referring to the table, and obtain a time required to reach the set temperature by dividing the calculated temperature difference by the determined increase rate of the room temperature.

Then, the air conditioner 201 may determine the time earlier than the expected arrival time of the new user by the required time, as the activation timing of the air conditioner 201, determine the preferred temperature of the new user as the set temperature of the air conditioner 201, and reserve activation of the air conditioner 201, using the activation timing and the set temperature of the air conditioner 201.

When the room temperature at the expected arrival time is estimated, for instance, the air conditioner 201 specifies a time zone (morning, day, or night) to which the expected arrival time belongs, and a time zone to which the current time belongs. When the expected arrival time and the current time belong to the time zones different from each other, the air conditioner 201 may estimate the room temperature at the expected arrival time by adding a predetermined temperature difference to the current room temperature based on the time zone to which the current time belongs and the time zone to which the expected arrival time belongs. On the other hand, when the expected arrival time and the current time belong to the same time zone, the air conditioner 201 may estimate the current room temperature as the room temperature at the expected arrival time.

Then, the air conditioner 201 transmits a set state of the air conditioner 201 representing the contents of activation reservation to the setting unit 206.

The set state to be transmitted includes the current time and the current room temperature, the activation timing of the air conditioner 201 and the expected room temperature at the activation timing, and the expected arrival time and the expected room temperature at the expected arrival time.

As a principle, the expected room temperature at the expected arrival time is the preferred temperature of the user. However, when a difference between the preferred temperature of the user and the current room temperature is too large, it may be impossible to obtain the preferred temperature of the user by the expected arrival time. In this case, the expected room temperature at the expected arrival time is a temperature different from the preferred temperature of the user, and may be a temperature at the expected arrival time, which is estimated by the air conditioner 201.

Subsequently, the setting unit 206 stores the user ID of the new user and the set state notified from the air conditioner 201 in the information storage unit 205, and the stored contents is notified to the navigation device 100 of the new user via the communication unit 204 (Step S691).

Figure 10:
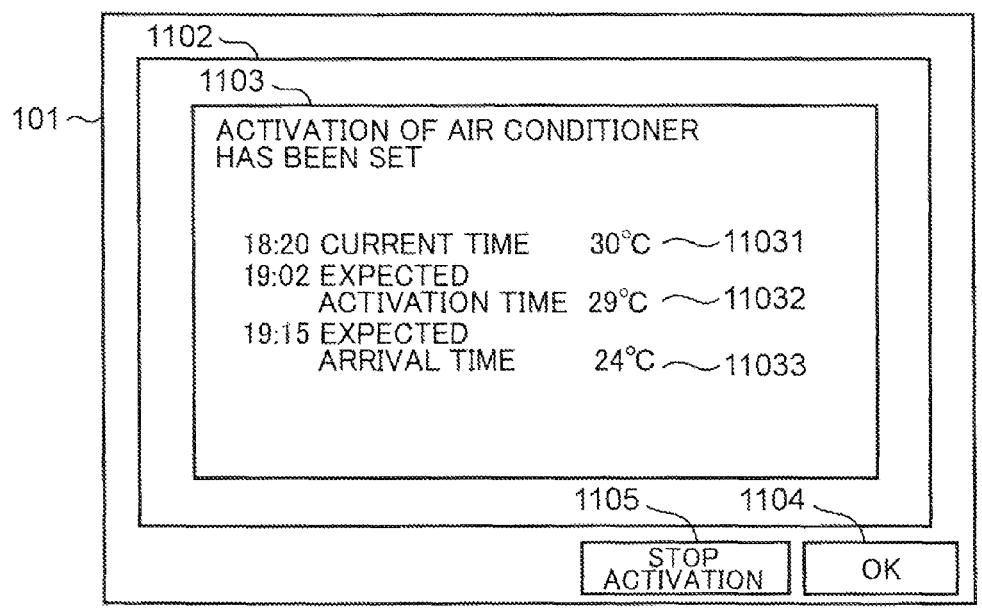
FIG. 10 is a diagram illustrating a setting notification screen for notifying the user of a set state of the air conditioner.

In this case, the navigation control unit 107 of the navigation device 100 of the new user receives the user ID of the new user and the set state via the communication unit 106. Then, the navigation control unit 107 controls the display unit 101 to display a setting notification screen 1102 illustrated in FIG. 10, using the set state. FIG. 10 is a diagram illustrating the setting notification screen 1102 for use in notifying the user of the set state of the air conditioner 201. The setting notification screen 1102 includes a setting contents display column 1103 for use in notifying the user of the setting contents. The setting contents display column 1103 displays, for instance, a message "ACTIVATION OF AIR CONDITIONER HAS BEEN SET". Further, the setting contents display column 1103 includes a current state display column 11031 for displaying the current time and the current room temperature, an activation time state display column 11032 for displaying the expected activation time of the air conditioner 201 and the expected room temperature at the expected activation time, and an arrival time state display column 11033 for displaying the expected arrival time and the expected room temperature at the expected arrival time.

In the example illustrated in FIG. 10, the current state display column 11031 displays "18:20 CURRENT TIME 30° C.". This means that the room temperature at home is 30° C. at the current time 18:20. Further, the activation time state display column 11032 displays "19:02 EXPECTED ACTIVATION TIME 29° C.". This means that the expected activation time when the air conditioner 201 is actually turned on is 19:02, and the expected room temperature at the expected activation time is 29° C. Further, the arrival time state display column 11033 displays "19:15 EXPECTED ARRIVAL TIME 24° C.". This means that the expected room temperature at the expected arrival time 19:15 is 24° C.

Displaying the setting notification screen 1102 makes it possible to notify the user on the way back home of the set state of the air conditioner 201 to the effect that the air conditioner 201 is actually turned on at a time earlier than the expected arrival time by predetermined minutes and whether or not the expected room temperature reaches the preferred temperature by the expected arrival time.

When the user agrees to the set state, the user touches an icon 1104 indicating "OK". On the other hand, when the user does not agree to the set state, and wants to stop activation reservation of the air conditioner 201, the user touches an icon 1105 indicating "STOP ACTIVATION" to stop activation reservation.

When the user touches the icon 1105, the navigation control unit 107 transmits, to the home network 200, the user ID stored in the data storage unit 103, and an instruction to stop activation reservation, using the communication unit 106. In response to receiving the instruction to stop activation reservation, the setting unit 206 cancels activation reservation. According to this control, the user is allowed to stop activation reservation whose instruction has been input through the confirmation screen 1002, through the setting notification screen 1102.

In Step S64, when there is an existing user (NO in Step S64), the setting unit 206 compares the expected arrival time of the convention user and the expected arrival time of the new user (Step S65). When the expected arrival time of the new user is earlier than the expected arrival time of the existing user ("ARRIVAL OF NEW USER IS EARLIER" in Step S65), the setting unit 206 transmits, to the air conditioner 201, a reservation instruction including the preferred temperature and the expected arrival time of the new user (Step S67). In this case, the air conditioner 201 is turned on based on the expected arrival time of the new user. Since the process of Step S67 is the same as the process of Step S69, description thereof is omitted herein.

Subsequently, the setting unit 206 notifies the existing user that activation reservation of the air conditioner 201 has been changed (Step S68). In this case, the setting unit 206 stores the user ID of the new user and the set state of the air conditioner 201 in the information storage unit 205, and notifies the navigation device 100 of the existing user, of the user ID of the new user and the set state of the air conditioner 201 via the communication unit 204.

Figure 11:
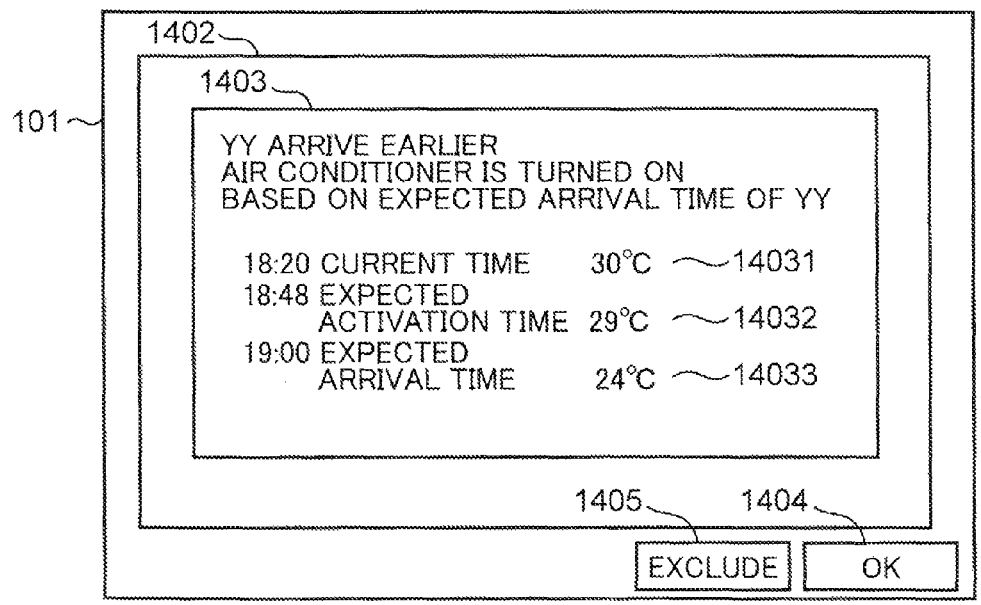
FIG. 11 is a diagram illustrating a setting notification screen to be notified to the user when the expected arrival time of another user is earlier than the expected arrival time of the user.

In this case, the navigation control unit 107 of the navigation device 100 of the existing user receives the user ID of the new user and the set state via the communication unit 106. Then, a setting notification screen 1402 illustrated in FIG. 11 is displayed based on the set state. FIG. 11 is a diagram illustrating the setting notification screen 1402 to be notified to the user when the expected arrival time of another user is earlier than the expected arrival time of the user. The setting notification screen 1402 includes a setting contents display column 1403 for use in notifying that the expected arrival time of another user is earlier. The setting contents display column 1403 displays, for instance, a message "YY ARRIVE EARLIER. AIR CONDITIONER IS TURNED ON BASED ON EXPECTED ARRIVAL TIME OF YY". In this example, YY denotes the new user. According to this control, the existing user is allowed to know that the air conditioner 201 is turned on based on the expected arrival time of the new user, because the new user arrives earlier.

The setting contents display column 1403 includes a current state display column 14031 for displaying the current time and the current room temperature, an activation time state display column 14032 for displaying the expected activation time of the air conditioner 201 and the expected room temperature at the expected activation time, and an arrival time state display column 14033 for displaying the expected arrival time and the expected room temperature at the expected arrival time.

In the example illustrated in FIG. 11, the activation time state display column 14032 displays "18:48 EXPECTED ACTIVATION TIME 29° C.", and the arrival time state display column 14033 displays "19:00 EXPECTED ARRIVAL TIME 24° C.". According to this control, the existing user is allowed to know that the activation time of the air conditioner 201 is set back to 18:48, and the expected arrival time is set back to 19:00. The current state display column 14031 is the same as the column 11031 illustrated in FIG. 10 and having the same name as the column 11031.

When the existing user agrees to the set state, the existing user touches an icon 1404 indicating "OK". On the other hand, when the existing user permits activation reservation of the air conditioner 201, without considering the expected arrival time of himself/herself, the existing user touches an icon 1405 indicating "EXCLUDE".

When the icon 1405 is touched, the navigation control unit 107 transmits, to the home network 200, the user ID of the existing user stored in the data storage unit 103, and an exclusion instruction indicating that activation reservation is set, without considering the existing user, using the communication unit 106. Thereafter, when another expected arrival time is transmitted from the navigation device 100 of a user other than the existing user who touched the icon 1405, the setting unit 206 determines a user whose expected arrival time is earliest as the earliest user by excluding the existing user who touched the icon 1405. Then, the setting unit 206 transmits, to the air conditioner 201, a reservation instruction to reserve activation of the air conditioner 201 based on the expected arrival time of the earliest user.

Subsequently, the setting unit 206 performs a notification process of notifying the new user that activation reservation is set for the new user (Step S681).

Figure 12:
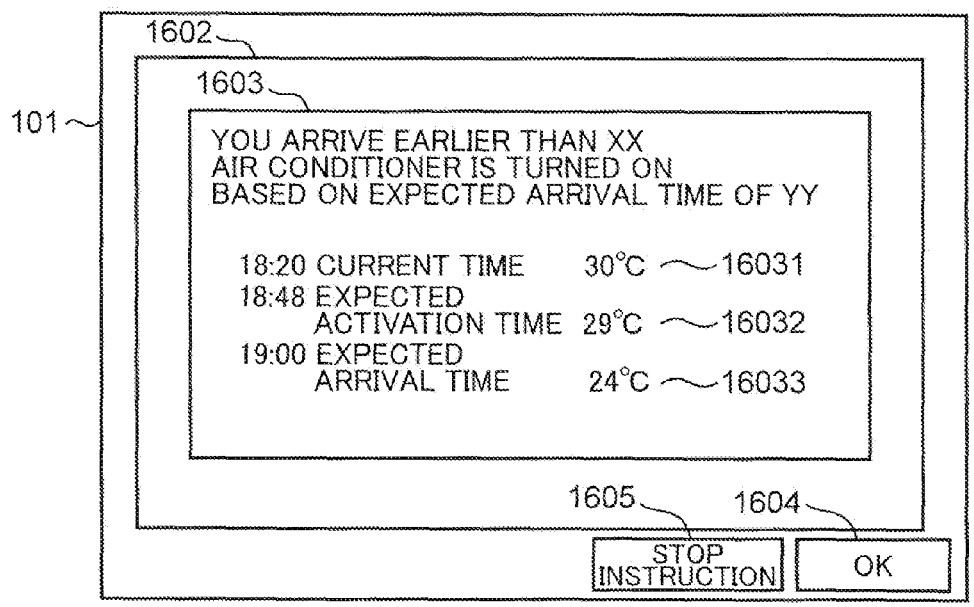
FIG. 12 is a diagram illustrating a setting notification screen to be notified to a new user when the information relating to activation reservation of the air conditioner is changed.

The notification process to the new user is described using FIG. 3 and FIG. 12. Referring to FIG. 3, the setting unit 206 reads the user ID of the existing user from the information storage unit 205, and the read contents is notified to the navigation device 100 of the new user via the communication unit 204.

The navigation control unit 107 of the navigation device 100 receives the user ID of the existing user and the set state via the communication unit 106. Then, the navigation control unit 107 of the navigation device 100 displays a setting notification screen 1602 illustrated in FIG. 12, based on the set state. FIG. 12 is a diagram illustrating the setting notification screen 1602 to be notified to the new user when activation reservation of the air conditioner 201 is changed. The setting notification screen 1602 includes a setting contents display column 1603 for use in notifying the existing user that activation reservation has been changed. The setting contents display column 1603 displays a message "YY ARRIVE EARLIER. THAN XX. AIR CONDITIONER IS TURNED ON BASED ON EXPECTED ARRIVAL TIME OF YY", which is different from the message displayed in the setting contents display column 1403 illustrated in FIG. 11. In this example, XX denotes the existing user, and YY denotes the new user. According to this control, the new user is allowed to know that the air conditioner 201 is turned on based on the expected arrival time of the new user, because the new user arrives earlier than the existing user. Further, as well as the drawing of FIG. 11, the setting contents display column 1603 includes a current state display column 16031, an activation time state display column 16032, and an arrival time state display column 16033. According to this control, the new user is allowed to know that the expected start time when the air conditioner 201 is actually started to operate, and the expected room temperature at the expected arrival time of himself/herself.

When the new user agrees to the set state, the user touches an icon 1604 indicating "OK". On the other hand, when the new user wants to stop activation reservation of the air conditioner 201, the new user touches an icon 1605 indicating "STOP INSTRUCTION" to stop activation reservation. When the icon 1605 is touched, the navigation control unit 107 transmits, to the home network 200, the user ID of the new user stored in the data storage unit 103, and the instruction to stop activation reservation, using the communication unit 106.

In response to receiving the instruction to stop activation reservation, the setting unit 206 transmits, to the air conditioner 201, a reservation instruction including the expected arrival time of the earliest user whose expected arrival time is earliest among the existing users by excluding the new user, and the user ID of the earliest user. According to this control, the air conditioner 201 is turned on based on the expected arrival time of the earliest user whose expected arrival time is earliest among the existing users.

In Step S65, when the expected arrival time of the existing user is earlier than the expected arrival time of the new user ("ARRIVAL OF EXISTING USER IS EARLIER" in Step S65), the process is proceeded to S66, without notifying a reservation instruction to the air conditioner 201, because it is not necessary to change activation reservation of the air conditioner 201.

In Step S66, the setting unit 206 notifies the navigation device 100 of the new user, of the set state of the air conditioner 201, and the user ID of the earliest user whose expected arrival time is earliest among the existing users.

In this case, as well as Step S68, the navigation control unit 107 of the navigation device 100 of the new user is controlled to display the setting notification screen 1402 illustrated in FIG. 11. In this case, "YY" displayed in the setting contents display column 1403 denotes the existing user. According to this control, the new user is allowed to know that the air conditioner 201 is turned on based on the expected arrival time of the existing user, because the existing user arrives earlier than the new user.

Figure 13:
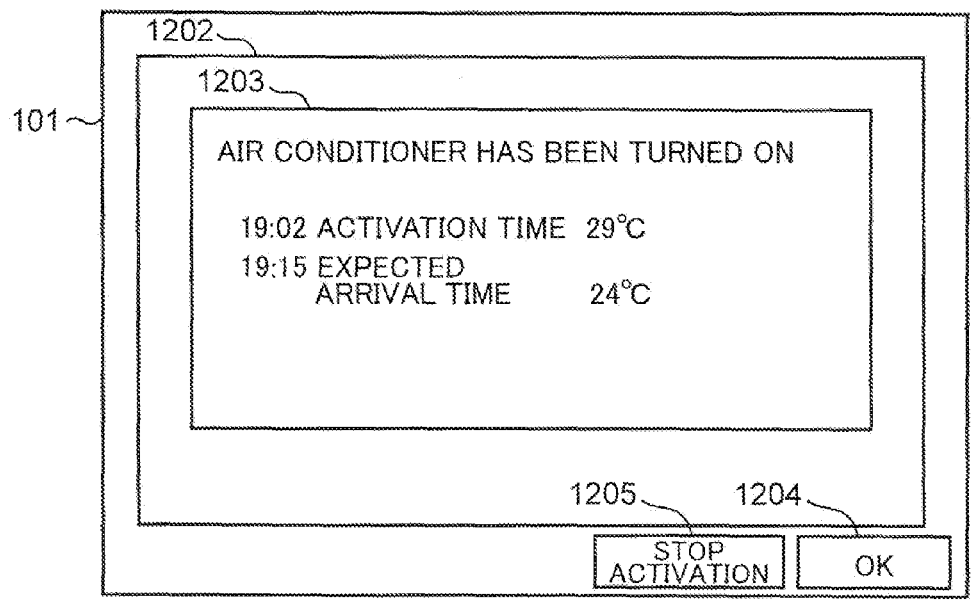

When the air conditioner 201 scheduled to activate is actually turned on, the setting unit 206 transmits activation notification to all the navigation devices 100. Then, the navigation control units 107 of the navigation devices 100 control the display units 101 to display an activation notification screen 1202 illustrated in FIG. 13. FIG. 13 is a diagram illustrating the activation notification screen 1202 to be displayed on a navigation device 100 when the air conditioner is actually turned on.

The activation notification screen 1202 includes an activation notification display column 1203 for use in notifying the user that the air conditioner 201 is actually turned on. The activation notification display column 1203 displays a message "AIR CONDITIONER HAS BEEN TURNED ON", Further, the activation notification display column 1203 displays the time indicating the activation timing of the air conditioner 201, and the expected room temperature at the activation time. Further, the activation notification display column 1203 displays the expected arrival time and the expected room temperature at the expected arrival time.

When the user does not agree to the activation notification, the user touches an icon 1205 indicating "STOP ACTIVATION". According to this control, activation of the air conditioner 201 is stopped. Thus, when the air conditioner 201 is turned on against the user's intention, the user is allowed to stop the operation of the air conditioner 201. On the other hand, when the user agrees to the activation notification, the user touches an icon 1204 indicating "OK". In this case, the operation of the air conditioner 201 is continued.

Figure 14:
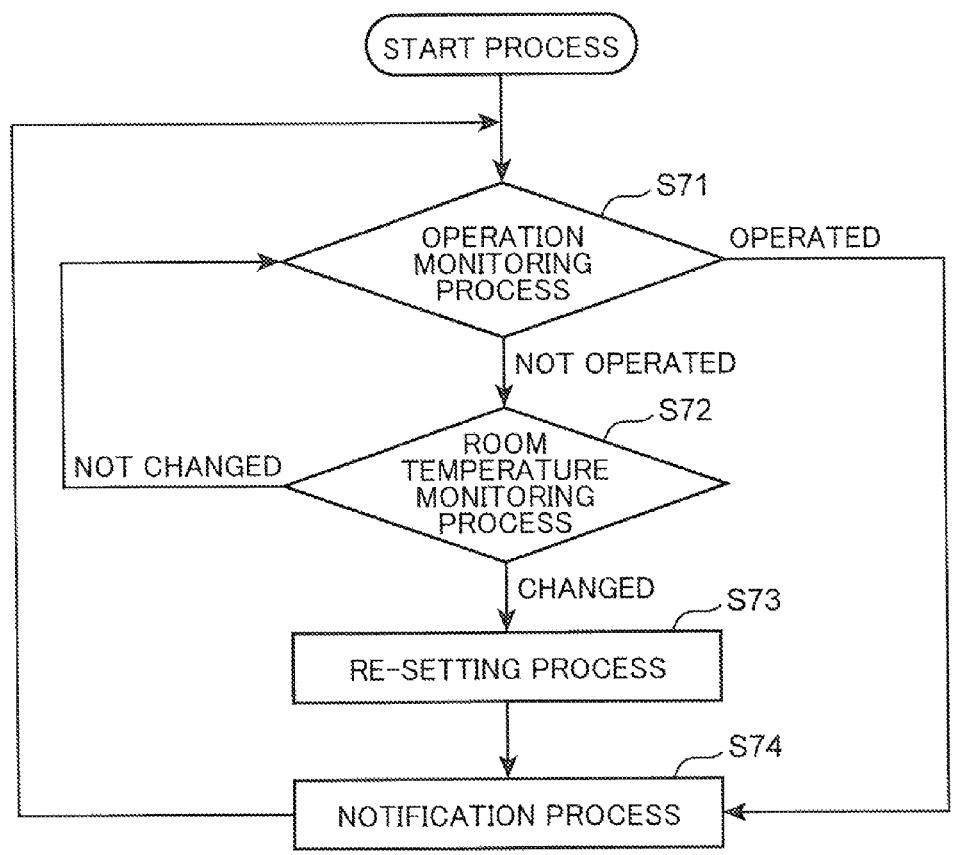
FIG. 14 is a flowchart illustrating a process of the home network when the state of the air conditioner is changed.

FIG. 14 is a flowchart illustrating a process of the home network 200 when the state of the air conditioner 201 is changed.

Figure 15:
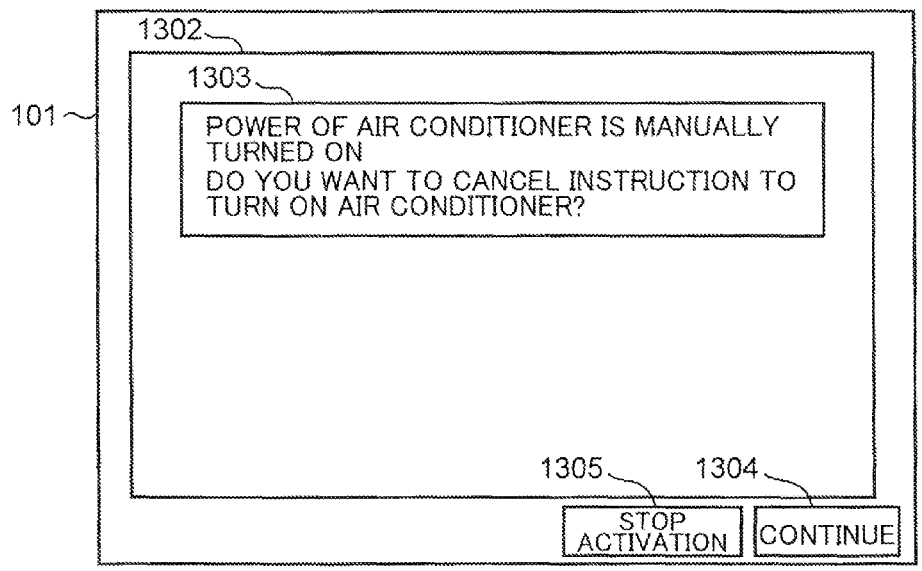

First of all, the air conditioner 201 monitors a user's operation (Step S71). When it is detected that the air conditioner 201 is manually turned on ("OPERATED" in Step S71), the air conditioner 201 notifies the setting unit 206 of activation notification indicating that the air conditioner 201 is turned on. In this case, the setting unit 206 notifies the navigation device 100 of the user that the air conditioner 201 is turned on via the communication unit 204. Then, the navigation control unit 107 of the navigation device 100 receives notification indicating that the air conditioner 201 is turned on via the communication unit 106. Then, the navigation control unit 107 controls the display unit 101 to display an activation notification screen 1302 illustrated in FIG. 15. FIG. 15 is a diagram illustrating the activation notification screen 1302 to be displayed on the navigation device 100, when the air conditioner 201 is manually turned on.

The activation notification screen 1302 includes an activation contents display column 1303 for displaying that the air conditioner 201 is manually turned on. In this example, the activation contents display column 1303 displays a message "POWER OF AIR CONDITIONER IS MANUALLY TURNED ON. DO YOU WANT TO CANCEL INSTRUCTION TO TURN ON AIR CONDITIONER?". According to this control, the user is notified that the power of the air conditioner 201 is turned on, and the user is prompted to reply whether the instruction to turn on the air conditioner 201 is cancelled.

When the user who is notified that the air conditioner 201 is turned on does not agree to the activation, and wants to cancel the activation instruction, the user touches an icon 1305 indicating "STOP ACTIVATION". In this case, the navigation control unit 107 transmits an instruction to stop activation to the setting unit 206. Then, the setting unit 206 transmits an instruction to stop activation to the air conditioner 201 so as to stop activation of the air conditioner 201. According to this control, the user is allowed to cancel activation of the air conditioner 201, even when the air conditioner 201 is turned on against his/her intention.

On the other hand, when the user agrees to activation of the air conditioner 201, the user touches an icon 1304 indicating "CONTINUE". In this case, the navigation control unit 107 does not transmit any data to the setting unit 206, and the activation of the air conditioner 201 is continued.

When there is no user's input operation ("NOT OPERATED" in Step S71), the air conditioner 201 detects the presence or absence of a change in the room temperature (Step S72). When a change in the room temperature is detected ("CHANGED" in Step S72), the air conditioner 201 performs a re-setting process (Step S73). In this example, the re-setting process is a process of setting again the set state such as the activation time of the air conditioner 201 or the set temperature of the air conditioner 201, using the current time and the current room temperature, and the expected arrival time of the earliest user and the preferred temperature of the earliest user.

For instance, it is assumed that the air conditioner 201 detects an increase in the room temperature, and the air conditioner 201 judges that it is impossible to set the room temperature to the preferred temperature of the earliest user by the expected arrival time of the earliest user. In this case, the air conditioner 201 performs a re-setting process. In this case, the air conditioner 201 may perform a re-setting process by calculating an activation timing so as to set the room temperature to the preferred temperature of the earliest user at the expected arrival time of the earliest user.

Subsequently, the air conditioner 201 notifies the re-set state (set state) to the setting unit 206 (Step S74). In this case, the set state includes the current time and the current room temperature, the expected activation time of the air conditioner 201 and the expected room temperature at the expected activation time, and the expected arrival time and the expected room temperature at the expected arrival time.

In response to receiving the set state, the setting unit 206 stores the set state notified from the air conditioner 201 in the information storage unit 205, and notifies the set state to all the navigation devices 100 via the communication unit 204. The navigation control units 107 of the navigation devices 100 receive the set state via the communication units 106. Then, the navigation control units 107 control the display units 101 to display a re-setting notification screen 2102 illustrated in FIG. 16, based on the set state.

Figure 16:
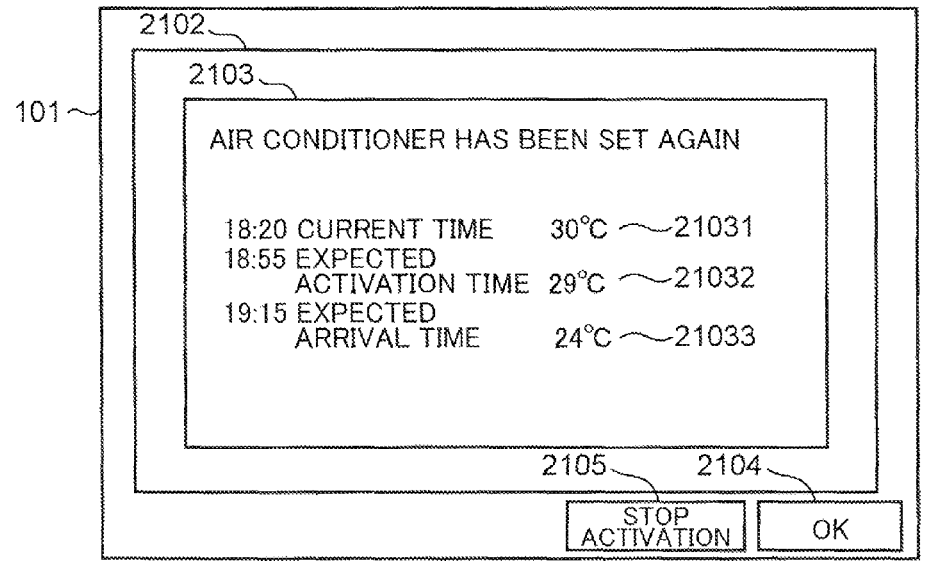
FIG. 16 is a diagram illustrating a re-setting notification screen for notifying the user that the air conditioner is set again.

FIG. 16 is a diagram illustrating the re-setting notification screen 2102 for use in notifying the user that the air conditioner 201 has been set again. The re-setting notification screen 2102 includes a setting contents display column 2103 for use in notifying the user of the setting contents which have been set again. The setting contents display column 2103 displays a message, for instance, "AIR CONDITIONER HAS BEEN SET AGAIN" to notify the user that the air conditioner 201 has been set again. It should be noted that a current state display column 21031, an activation time state display column 21032, and an arrival time state display column 21033 are the same as the columns 11031, 11032, and 11033 illustrated in FIG. 10 and having the same names as the columns 11031, 11032, and 11033. FIG. 16 illustrates an example, in which the set state of the air conditioner 201 is changed because the room temperature has increased. Specifically, the activation time "19:02" of the air conditioner 201 in FIG. 10 is set back to "18:55" in FIG. 16 in order to obtain a room temperature 24° C. by the expected arrival time 19:55.

When the user agrees to the set state, the user touches an icon 2104 indicating "OK". On the other hand, when the user does not agree to the set state, and wants to stop activation reservation of the air conditioner 201, the user touches an icon 2105 indicating "STOP ACTIVATION" to stop activation reservation of the air conditioner 201. The processes to be performed when the icons 2104 and 2105 are touched are described referring to FIG. 10, and therefore, repeated description thereof is omitted herein.

As described above, in the first embodiment, the user is allowed to turn on the air conditioner 201 to obtain a preferred temperature by the expected arrival time at home without performing a complicated operation. Further, when two or more users are coming home, it is possible to turn on the air conditioner 201 in such a manner that the preferred temperature of the earliest user is obtained based on the expected arrival time of the earliest user. Further, the expected arrival time of the earliest user and the expected room temperature at the expected arrival time of the earliest user are notified to the earliest user and to the rest of the users. This is advantageous for the users to easily know the set state of the air conditioner 201 through the display units 101 of the navigation devices 100.

Second Embodiment

In this section, an air conditioning control system in a second embodiment is described referring to the drawings. In the first embodiment, a change in the expected arrival time of a user on the way back home is not considered. In the second embodiment, a change in the expected arrival time of a user on the way back home is considered.

Figure 17:
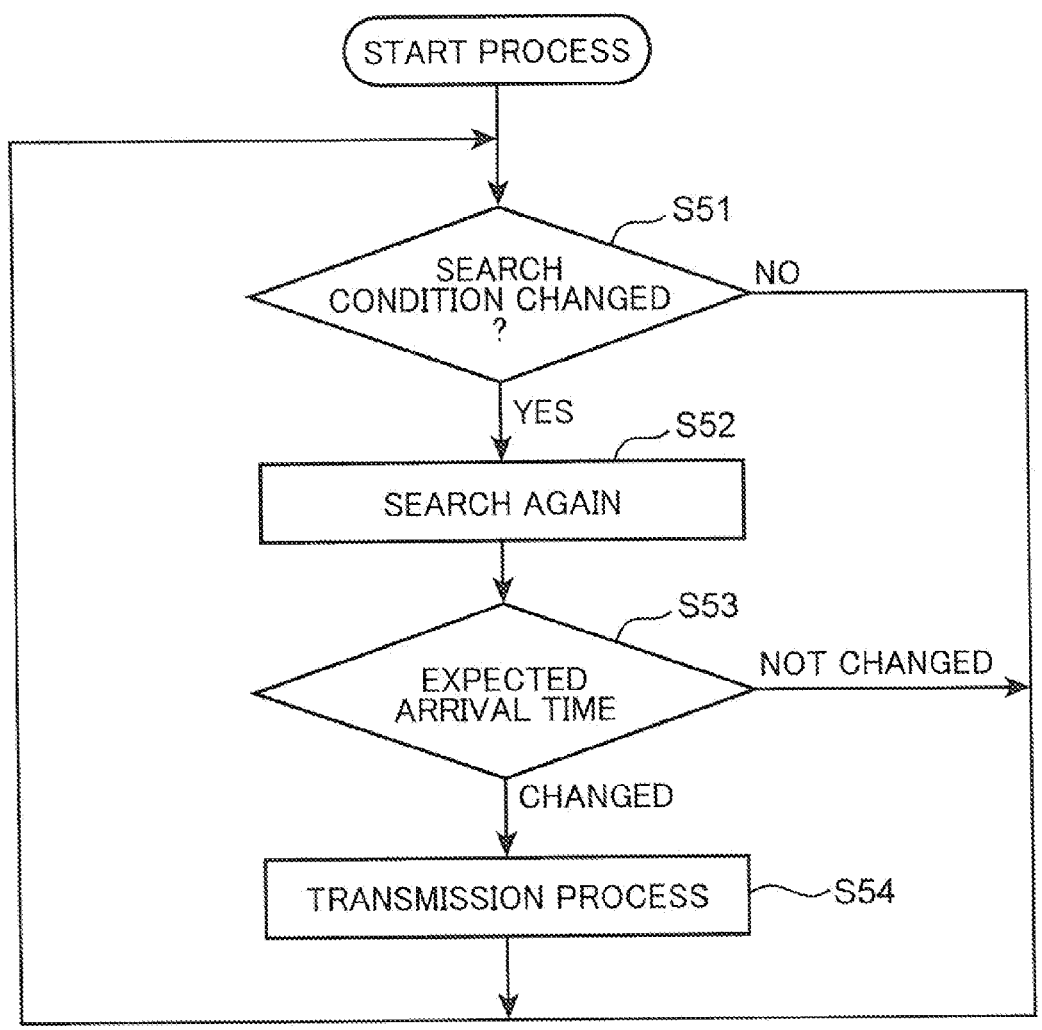
FIG. 17 is a flowchart illustrating a process to be performed by a navigation device, when the expected arrival time is changed due to traffic jam or the like in a state that the user has already reserved activation of the air conditioner from the navigation device so that a preferred temperature is set by the expected arrival time.

FIG. 17 is a flowchart illustrating a process to be performed by a navigation device 100 when the expected arrival time is changed due to traffic jam or the like in a state that the user has already reserved activation of an air conditioner 201 from the navigation device 100 to obtain a preferred temperature by the expected arrival time.

When the route searching condition is changed due to traffic jam or due to driving on a road other than the route searched by the navigation device 100, the navigation device 100 searches a new route. This causes a change in the expected arrival time. In the following, a process to be performed in this case is described using FIG. 17.

First of all, a navigation control unit 107 monitors whether there is no change in the search condition (Step S51). When there is a change in the search condition (YES in Step S51), the navigation control unit 107 instructs a route searching unit 105 to search a route again. The route searching unit 105 may monitor a change in the search condition, and search a route again. On the other hand, when there is no change in the search condition (NO in Step S51), the process is returned to Step S51. In this example, the navigation control unit 107 may periodically receive VICS (Vehicle Information and Communication System) (registered trademark) information, and determine that the search condition is changed, when the VICS (registered trademark) information indicates that traffic jam has occurred on the route to home.

The route searching unit 105 searches again a route to home, which is stored in a data storage unit 103, and the expected arrival time at home, using a current position calculated by a position calculation unit 104 (Step S52). Subsequently, the navigation control unit 107 determines whether the expected arrival time has changed as a result of the re-searching operation (Step S53). When there is a change in the expected arrival time ("CHANGED" in Step S53), the navigation control unit 107 transmits, to a home network 200, the user ID stored in the data storage unit 103, and the changed expected arrival time, using a communication unit 106 (Step S54). On the other hand, when there is no change in the expected at arrival time ("NOT CHANGED" in Step S53), the process is returned to Step S51.

Figure 18:
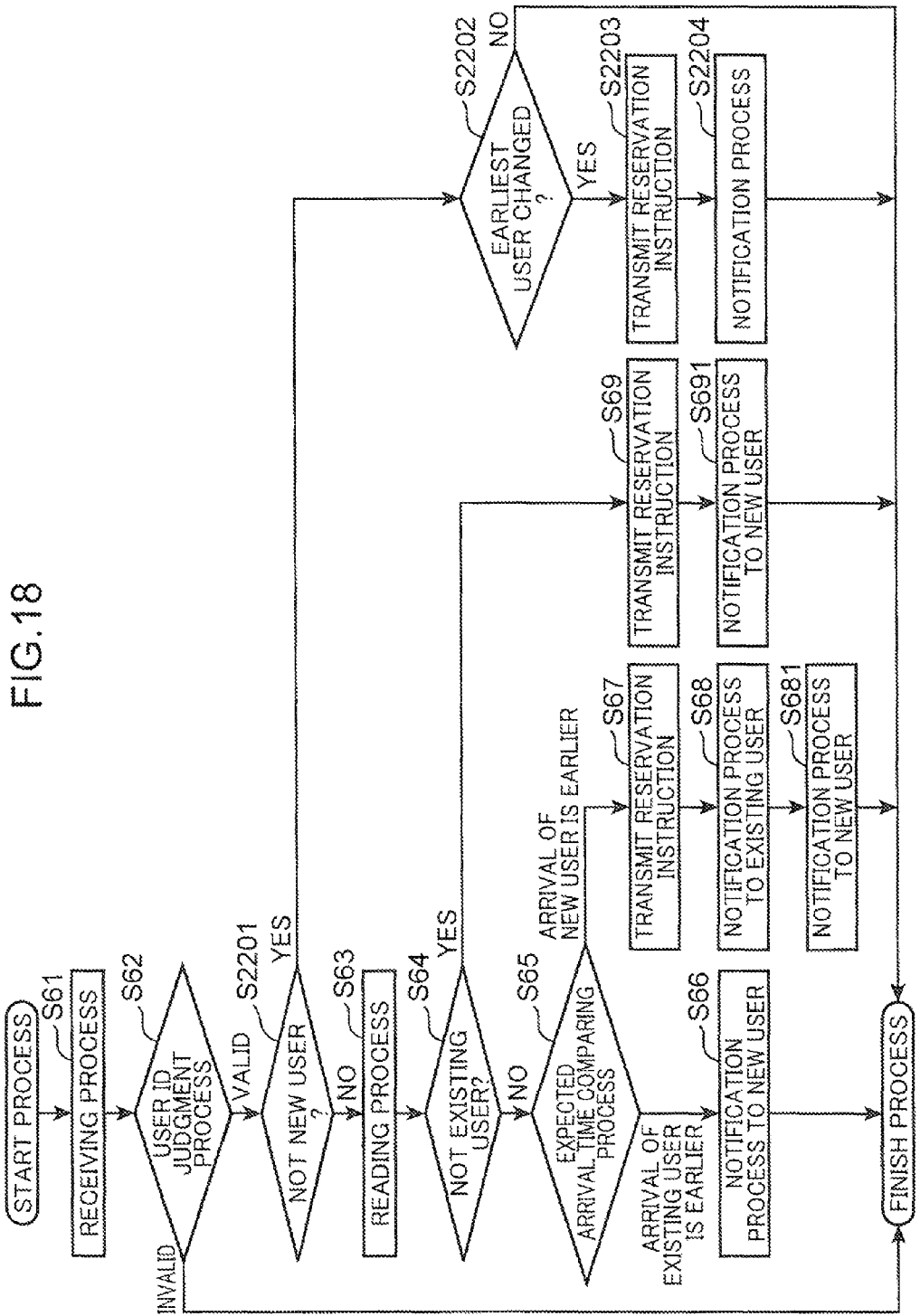
FIG. 18 is a flowchart of a home network, following the flowchart of the navigation device illustrated in FIG. 17 in a second embodiment.

Next, a process of the home network 200 to which the changed expected arrival time is transmitted is described using FIG. 18. FIG. 18 is a flowchart of the home network 200 in the second embodiment, following the flowchart of the navigation device 100 illustrated in FIG. 17. In FIG. 18, Steps S2201 to S2204 are newly added to the steps illustrated in FIG. 9.

In Step S2201, a setting unit 206 determines whether the user ID received in Step S61 is the user ID of a new user. When it is determined that the user ID is the user ID of the new user (NO in Step S2201), the process proceeds to Step S63. Thereafter, the same process as in the first embodiment is performed.

On the other hand, when the user ID is not the user ID of the new user (YES in Step S2201), the process is proceeded to Step S2202.

In Step S2202, the setting unit 206 checks whether the earliest user has changed because of the expected arrival time received in Step S61, in other words, because of the expected arrival time obtained by the re-searching operation. For instance, it is assumed that there is another user who reserved activation, in addition to the earliest user. It is assumed that the earliest user is the user A, another user is the user B, the expected arrival time of the user A is tA, and the expected arrival time of the user B is tB. For instance, the expected arrival time tj received in Step S61 is the expected arrival time of the user A. In this case, the setting unit 206 compares the expected arrival time tj and the expected arrival time tB. When it is determined that the expected arrival time tj is later than the expected arrival time tB, it is determined that the earliest user is changed from the user A to the user B, and the determination result in Step S2202 is YES. On the other hand, when the expected arrival time tj is earlier than the expected arrival time tB, the setting unit 206 determines that the earliest user remains as the user A, and the determination result in Step S2202 is NO.

Further, it is assumed that the expected arrival time tj is the expected arrival time of the user B, who is not the earliest user. In this case, the setting unit 206 compares the expected arrival time tj, and the expected arrival time tA of the user A, who is the earliest user. When the expected arrival time tj is earlier than the expected arrival time tA, the setting unit 206 determines that the earliest user is changed from the user A to the user B, and the determination result in Step S2202 is YES.

On the other hand, when the expected arrival time tj is later than the expected arrival time tA, the setting unit 206 determines that the earliest user remains as the user A, and the determination result in Step S2202 is NO.

When the earliest user is not changed (NO in Step S2202), the process is ended, because it is not necessary to change activation reservation of the air conditioner 201.

On the other hand, when the earliest user is changed (YES in Step S2202), the process is proceeded to Step S2203, because it is necessary to change activation reservation of the air conditioner 201.

In Step S2203, the setting unit 206 transmits, to the air conditioner 201, a reservation instruction including the user ID of the earliest user and the preferred temperature of the earliest user (Step S2203).

In this case, as well as Step S69, the air conditioner 201 reserves activation of the air conditioner 201 so that the air conditioner 201 is turned on at the preferred temperature of the earliest user at the changed expected arrival time of the earliest user, and transmits the set state to the setting unit 206.

Subsequently, the setting unit 206 transmits the user 11) of the earliest user and the set state to all the navigation devices 100 which have transmitted the expected arrival times. In this case, the setting unit 206 causes display units 101 to display the re-setting notification screen 2102 (see FIG. 16) for use in notifying the users that the air conditioner 201 has been set again.

As described above, in the second embodiment, even when the expected arrival time at home is changed on the way back home due to traffic jam or the like, it is not necessary for the user to operate the navigation device 100 so as to set activation reservation of the air conditioner 201 again. Further, when the earliest user is changed, and the set state such as the activation timing of the air conditioner 201 is changed due to a change in the expected arrival time, it is possible to notify the user of the change in the set state, because the changed set state is displayed on the navigation device 100.

Third Embodiment

A third embodiment has a feature that a reservation instruction is transmitted to an air conditioner installed in a room where a user is supposed to stay. The same constituent elements in the third embodiment as those in the first and second embodiments are indicated with the same reference signs, and description thereof is omitted herein.

Figures 19, 20:
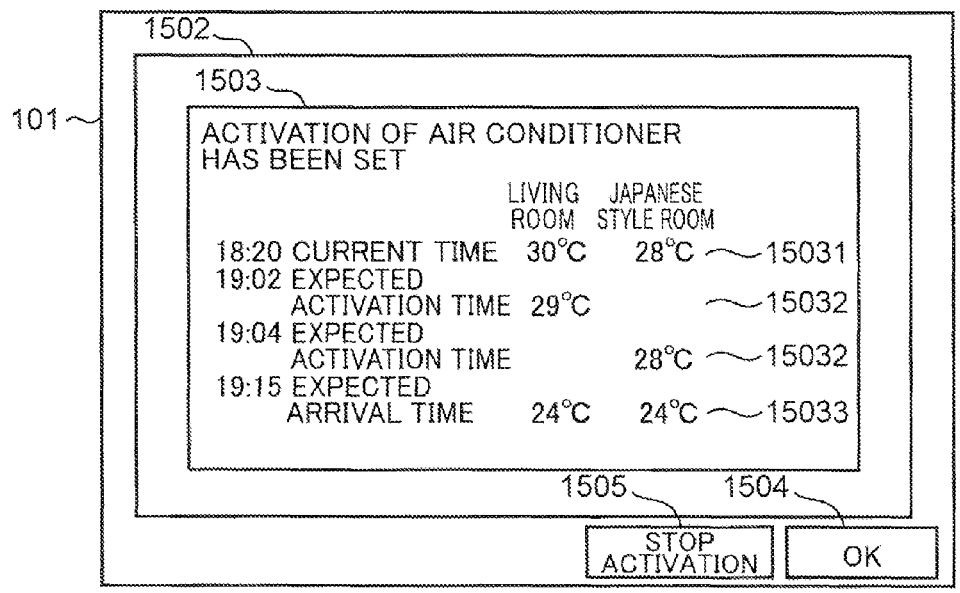
FIG. 19 is a diagram illustrating a data configuration of management data in a third embodiment.
FIG. 20 is a diagram illustrating a setting notification screen for notifying the user of set states of air conditioners.

FIG. 19 is a diagram illustrating a data configuration of management data in the third embodiment. "ROOM IDs" for identifying the rooms where air conditioners 201 used by the users are installed are registered in the management data illustrated in FIG. 19, in addition to "PREFERRED TEMPERATURES" of the users. "ROOM IDs" are defined in advance by the users. For instance, the room ID "01" represents a living room, the room ID "02" represents a Japanese style room, and the room ID "03" represents a study. The example illustrated in FIG. 19 indicates that the user whose user ID is "00000002" uses the air conditioner 201 installed in the living room whose "ROOM ID" is "01", and the air conditioner 201 installed in the Japanese style room whose "ROOM ED" is "02". This is based on the premise that in some homes, air conditioners 201 are used by two or more users.

A process to be performed by an air conditioning control system in the third embodiment is described using FIG. 9. Steps S61 to S62 are the same as those in the first embodiment. In Step S63, a setting unit 206 reads information relating to a new user from an information storage unit 205. The setting unit 206 reads the preferred temperature and the room ID of the new user, which are registered in the management data illustrated in FIG. 19.

Steps S64 and S65 are the same as those in the first embodiment. In Step S69, a reservation instruction is transmitted to the new user. In this case, in Step S61, assuming that the expected arrival time of the user whose user ID is "00000002" is transmitted from a navigation device 100, the setting unit 206 transmits a reservation instruction to the air conditioner 201 installed in the room indicated by the room ID "01" and to the air conditioner 201 installed in the room indicated by the room ID "02", because the room IDs "01" and "02" are registered with respect to the user ID "00000002" (Step S69). In this case, it is possible to reserve activation of the two air conditioners 201 in the same manner as in the first embodiment. The two air conditioners 201 respectively transmit the set states of the air conditioners 201 including the activation reservation contents to the setting unit 206.

Subsequently, the setting unit 206 stores the user ID of the new user and the set states notified from the air conditioners 201 in the information storage unit 205, and transmits the stored contents to the navigation device 100 of the new user via a communication unit 204 (Step S691).

In this case, the navigation device 100 of the new user displays a setting notification screen 1502 illustrated in FIG. 20 on a display unit 101. FIG. 20 is a diagram illustrating the setting notification screen 1502 for use in notifying the user of the set states of the air conditioners 201. A setting contents display column 1503 is provided to notify the user of setting contents. Specifically, the setting notification screen 1502 includes the setting contents display column 1503 for use in notifying the user of setting contents. In FIG. 20, the setting contents display column 1503 displays the set states of the air conditioners 201 in the living room and in the Japanese style room, because activation is reserved for the air conditioners 201 in the living room and in the Japanese style room. Specifically, the setting contents display column 1503 includes a current state display column 15031, an activation state display column 15032, and an arrival time state display column 15033. The display contents of the columns 15031, 15032, and 15033 are the same as the display contents of the columns 11031, 11032, and 11033 illustrated in FIG. 10 and having the same names as the columns 11031, 11032, and 11033, and therefore, description thereof is omitted herein.

It is possible to store in advance the room Ms and the names of the rooms in a data storage unit 103 of the navigation device 100, so that a navigation control unit 107 reads the stored contents from the data storage unit 103 when the setting notification screen 1502 is created.

According to this control, the user on the way back home is allowed to confirm that the two air conditioners 201 installed in the two rooms are activated by the expected arrival time.

When the user agrees to the set state, the user touches an icon 1504 indicating "OK". On the other hand, when the user does not agree to the set state, and wants to stop activation reservation of the air conditioners 201, the user touches an icon 1505 indicating "STOP ACTIVATION". The processes thereafter are the same as those in the first embodiment.

In Steps S66 and S68, unlike the setting notification screen 1402 illustrated in FIG. 11, there is displayed a setting notification screen 1402 for displaying the set states of two or more air conditioners 201 which are reserved to activate. Further, in Step S681, unlike the setting notification screen 1602 illustrated in FIG. 12, there is displayed a setting notification screen 1602 for displaying the set states of the air conditioners 201 which are reserved to activate.

In the third embodiment, it is possible for the user to reserve activation of an intended air conditioner 201, without an input operation of choosing the intended air conditioner 201, when two or more air conditioners 201 are installed at home. Further, it is easy for the user to grasp the set states of the air conditioners 201 as described above through the display unit 101 of the navigation device 100.

Fourth Embodiment

A fourth embodiment has a feature that a reservation instruction is transmitted to an air conditioner 201 installed in a room where a user is supposed to stay at an expected arrival time, using a behavior pattern of the user.

In the embodiment, a setting unit 206 uses behavior pattern data 2000 illustrated in FIG. 21, in addition to the management data illustrated in FIG. 4 or in FIG. 5.

FIG. 21 is a diagram illustrating a data configuration of the behavior pattern data 2000 in the third embodiment. The behavior pattern data 2000 is data indicating in which room at home a certain user stays during each time zone. When it is assumed that three users A, B, and C live at home, there exist three pieces of behavior pattern data 2000 for the users A, B, and C.

In the behavior pattern data 2000, the vertical axis denotes the days of a week, and the horizontal axis denotes time zones. The room ID for identifying the room where a target user stays during each time zone is registered in each box of the behavior pattern data 2000. In the example illustrated in FIG. 21, 24 hours are divided into time zones hour by hour, such as the time zone 6:00 (from 6:00 to 6:59), and the time zone 7:00 (from 7:00 to 7:59).

The behavior pattern data 2000 may be created by a user's data input operation, or may be created based on a result of monitoring the user. In the latter case, for instance, a camera is installed in each room, and a control device 203 may store, in an information storage unit 205, image data captured by each camera for at least one week or longer. Then, the control device 203 may analyze the image data stored in the information storage unit 205, and specify which user stays in which room during each time zone on each day of a week. In this case, the control device 203 may determine whether a registered user is included in an image represented by the image data, using a face authentication technique.

The behavior pattern data 2000 may be stored in the information storage unit 205. Alternatively, the behavior pattern data 2000 may be stored in another device included in a home network 200, and the control device 203 may read the behavior pattern data from the device.

Next, a process to be performed by an air conditioning control system in the fourth embodiment is described using FIG. 9. Steps S61 to S62 are the same as those in the first embodiment. In Step S63, the setting unit 206 reads information relating to a new user from the information storage unit 205. The setting unit 206 reads the management data illustrated in FIG. 4 or in FIG. 5.

Steps S64 and S65 are the same as those in the first embodiment. In Step S69, a reservation instruction is transmitted to the new user. In this case, in Step S61, it is assumed that an expected arrival time is transmitted from the navigation device 100 in association with the user ID "00000001", for instance. Then, the setting unit 206 specifies in which room a target user is supposed to stay at the expected arrival time, referring to the behavior pattern data 2000 of the target user. In this example, today is Monday, and the expected arrival time of the target user is "20:30". When it is assumed that the behavior pattern data 2000 of the target user is illustrated by the data configuration illustrated in FIG. 21, in the example illustrated in FIG. 21, the target user stays in the room identified by the room ID "01" during the time zone "20:00" (from 20:00 to 20:59) on Monday. Further, in the management data illustrated in FIG. 4, the registered preferred temperature of the user identified by the user ID "00000001" is "27° C.". Therefore, the setting unit 206 transmits, to the air conditioner 201 installed in the room identified by the room ID "01", a reservation instruction including "27° C." as the preferred temperature of the user, and the expected arrival time "20:30".

According to this control, the room temperature of the room identified by the room ID "01" is set to the preferred temperature of the target user by the time when the target user comes home.

There may be a case, in which a room where a certain user is supposed to stay during a time zone to which the expected arrival time of the user belongs, is not registered in the behavior data pattern 2000 of the user. In such a case, the setting unit 206 may transmit a reservation instruction to the air conditioner 201 installed in a room (e.g. a living room or a room where the user is supposed to stay for many hours"). As well as Step S69, in Step S67, an air conditioner 201 to which a reservation instruction is transmitted is determined, using the behavior pattern data 2000, and the reservation instruction is transmitted to the air conditioner 201.

As described above, in the fourth embodiment, the user is allowed to reserve activation of an intended air conditioner 201, without an input operation of designating the room where the user is supposed to stay at the expected arrival time. In the foregoing description, FIG. 9 is applied as the process in the fourth embodiment. Alternatively, it is possible to apply FIG. 18.

Modification

When the setting unit 206 transmits a reservation instruction to the air conditioner 201, if a difference between the room temperature detected by the temperature sensor 202 and the preferred temperature of the earliest user is large, it may be impossible for the air conditioner 201 to set the room temperature to the preferred temperature of the earliest user by the expected arrival time of the earliest user. In this case, the setting unit 206 may notify the earliest user and the other users that it is impossible to set the room temperature to the preferred temperature of the earliest user by the expected arrival time of the earliest user.

Specifically, when the setting unit 206 transmits a reservation instruction in Steps S67 and S69 in FIG. 9 and in FIG. 18, if a temperature difference between the room temperature detected by the temperature sensor 202, and the preferred temperature of the earliest user exceeds a predetermined allowable value, the setting unit 206 may notify the navigation device 100 of disable notification indicating that it is impossible to set the room temperature to the preferred temperature by the expected arrival time of the earliest user. In this case, the allowable value may be a fixed value, or may be a predetermined value based on a time difference between the current time and the expected arrival time. The allowable value may be a maximum tolerable temperature difference between the room temperature, and the preferred temperature, to which the air conditioner 201 tries to reach from the current time by the expected arrival time.

Figure 22:
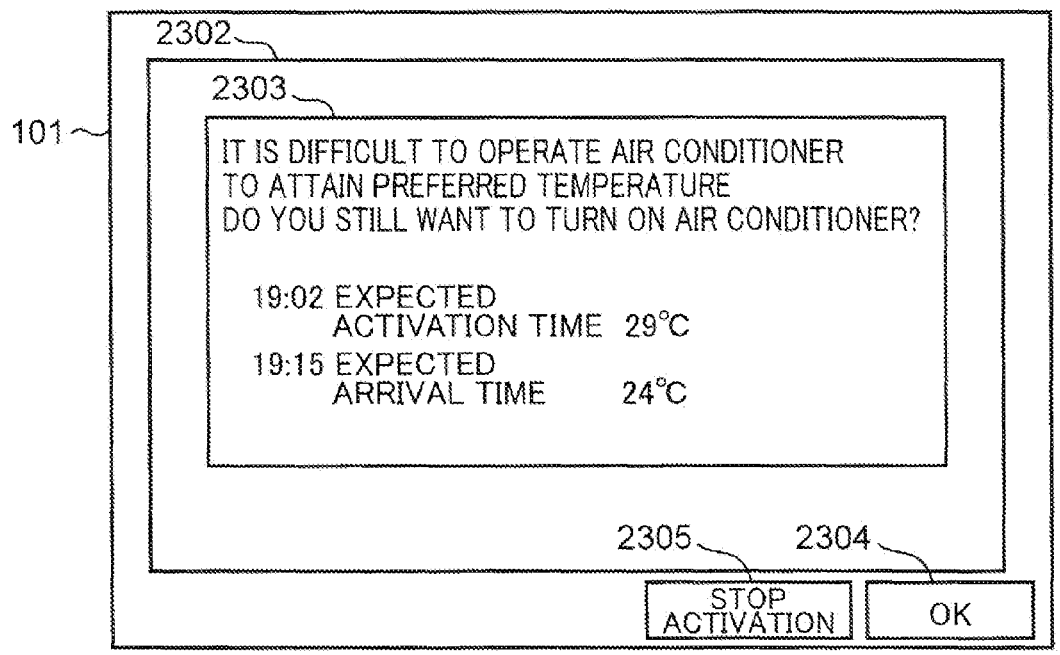
FIG. 22 is a diagram illustrating a disable notification screen to be displayed on a navigation device in response to receiving disable notification.

FIG. 22 is a diagram illustrating a disable notification screen 2302 to be displayed on the navigation device 100, when disable notification is received. The disable notification screen 2302 includes a disable display column 2303 for displaying that it is impossible to set the room temperature to the preferred temperature by the expected arrival time. In the example illustrated in FIG. 22, a message "IT IS DIFFICULT TO OPERATE AIR CONDITIONER TO ATTAIN PREFERRED TEMPERATURE, DO YOU STILL WANT TO TURN ON AIR CONDITIONER?" is displayed. Further, the disable notification screen 2302 also displays an activation timing and the expected room temperature of the air conditioner 201 at the expected activation time, and the expected arrival time and the expected room temperature at the expected arrival time. In this example, the room temperature to be displayed at the expected arrival time is a possibly best temperature most approximate to the preferred temperature of the user at the expected arrival time.

When the user does not agree to the set state, the user touches an icon 2305 indicating "STOP ACTIVATION" to cancel activation reservation of the air conditioner 201. The process of cancelling activation reservation is described as above, and therefore, repeated description thereof is omitted herein. On the other hand, when the user agrees to the set state, the user touches an icon 2304 indicating "OK".

INDUSTRIAL APPLICABILITY

An air conditioning control system of the invention is useful when two or more users control an air conditioner installed at home from a remote place.

The invention claimed is:

1. An air conditioning device control method for use in an air conditioning control system provided with a navigation device which guides a user home, a control device which controls an air conditioning device installed at the home, and the air conditioning device, wherein
the navigation device estimates an arrival time when the user utilizing the navigation device will arrive at the home, and transmits the estimated arrival time and a user identifier of the associated user to the control device;
the control device, in response to receiving the estimated arrival times from a plurality of the navigation devices, transmits, to the air conditioning device, a reservation instruction for setting a room temperature at the home to a predetermined target temperature by the estimated arrival time of an earliest user who is estimated to arrive at the home earliest among the users;
the air conditioning device is turned on in accordance with the transmitted reservation instruction;
the navigation device causes a display device to display a confirmation screen for allowing the user to choose whether to cancel an activation reservation of the air conditioning device, and in response to the user's choosing to cancel the activation reservation, cancellation notification is transmitted to the control device; and in response to receiving the cancellation notification, the control device determines the earliest user from among the users other than the user who canceled the activation reservation.

2. The control method according to claim 1, wherein
when the estimated arrival time is changed, the navigation device transmits the changed estimated arrival time to the control device in association with the user identifier, and
the control device updates the estimated arrival time of the earliest user, using the transmitted changed estimated arrival time.

3. The control method according to claim 1, wherein
the control device determines, as the target temperature, an intended temperature set by the earliest user, using management data, in which user identifiers of the users and intended temperatures of the air conditioning device set by the users are associated with each other.

4. The control method according to claim 3, wherein
the management data further includes registered room identifiers for identifying rooms at the home where the users use the air conditioning devices, and
the control device determines the room where the earliest user is likely to stay, using the management data, and transmits the reservation instruction to the air conditioning device installed in the determined room.

5. The control method according to claim 1, wherein
the control device determines the room where the earliest user is likely to stay at the estimated arrival time of the earliest user, using behavior pattern data indicating which user stays in which room at the home during each time zone, and transmits the reservation instruction to the air conditioning device installed in the specified room.

6. The control method according to claim 1, wherein
when the reservation instruction is transmitted to the air conditioning device, the control device transmits a setting notification to the navigation device of the earliest user, the setting notification includes the estimated arrival time of the earliest user and the target temperature.

7. The control method according to claim 1, wherein
when the reservation instruction is transmitted to the air conditioning device, the control device transmits a setting notification to the navigation device of a user other than the earliest user, the setting notification includes the estimated arrival time of the earliest user and the target temperature.

8. The control method according to claim 1, wherein
the control device monitors an operation state of the air conditioning device, and
when a change in the operation state is detected, the control device transmits a state change notification indicating the change to the navigation device.

9. The control method according to claim 1, wherein
after the reservation instruction is transmitted, when a change in the room temperature at the home is detected by a temperature sensor for measuring the room temperature, and an activation time of the air conditioning device is changed by the air conditioning device, the control device transmits, to the navigation device, a change notification including the detected temperature, the changed activation time, and the target temperature.

10. The control method according to claim 1, wherein
when the reservation instruction is transmitted, if a temperature difference between the room temperature at the home detected by a temperature sensor for measuring the room temperature, and the target temperature exceeds a predetermined allowable value, the control device notifies the navigation device of a disable notification indicating that it is impossible to set the target temperature by the estimated arrival time of the earliest user.

11. The control method according to claim 6, wherein
in response to receiving the setting notification, the navigation device causes a display device to display the confirmation screen for allowing the user to choose whether to cancel the activation reservation of the air conditioning device.

12. The control method according to claim 8, wherein
in response to receiving the state change notification, the navigation device causes a display device to display a confirmation screen for allowing the user to choose whether to stop activation of the air conditioning device, and in response to the user's choosing to stop activation, an activation stop instruction is transmitted to the control device, and
in response to receiving the activation stop instruction, the control device stops activation of the air conditioning device.

13. The control method according to claim 9, wherein
in response to receiving the change notification, the navigation device causes a display device to display the confirmation screen for allowing the user to choose whether to cancel the activation reservation of the air conditioning device.

14. The control method according to claim 10, wherein
in response to receiving the disable notification, the navigation device causes a display device to display the confirmation screen for allowing the user to choose whether to cancel the activation reservation of the air conditioning device.

15. An air conditioning control system provided with a navigation device which guides a user home, a control device which controls an air conditioning device installed at the home, and the air conditioning device, wherein
the navigation device includes:
an estimation unit which estimates an arrival time of when the user utilizing the navigation device will arrive at the home; and
a first communication unit which transmits the estimated arrival time and a user identifier of the associated user to the control device,
the control device includes:
a second communication unit; and
a setting unit which, in response to receiving the estimated arrival times from a plurality of the navigation devices by the second communication unit, transmits a reservation instruction to the air conditioning device via the second communication unit, the reservation instruction being an instruction for setting a room temperature at the home to a predetermined target temperature by the estimated arrival time of an earliest user who is estimated to arrive at the home earliest among the users,
the air conditioning device is turned on in accordance with the transmitted reservation instruction,
the navigation device further includes a display device which displays a confirmation screen for allowing the user to choose whether to cancel an activation reservation of the air conditioning device,
in response to the user's choosing to cancel the activation reservation, the first communication unit of the navigation device transmits a cancellation notification to the control device, and
in response to receiving the cancellation notification, the setting unit of the control device determines the earliest user from among the users other than the user who canceled the activation reservation.

16. A navigation device for use in an air conditioning control system provided with a navigation device which guides a user home, a control device which controls an air conditioning device installed at the home, and the air conditioning device, comprising:
an estimation unit which estimates a time when the user utilizing the navigation device will arrive at the home;
a communication unit which transmits the estimated arrival time and a user identifier of the associated user to the control device in association with a user identifier of the user so as to cause the control device to control the air conditioning device; and
a display device which displays a confirmation screen for allowing the user to choose whether to cancel an activation reservation of the air conditioning device, wherein
in response to the user's choosing the activation reservation cancellation, the communication unit transmits a cancellation notification to the control device so as to cause the control device to determine the earliest user who is estimated to arrive at the home earliest from among the users other than the user who canceled the activation reservation.

17. A control device for use in an air conditioning control system provided with a navigation device which guides a user home, a control device which controls an air conditioning device installed at the home, and the air conditioning device, comprising:
a communication unit; and
a setting unit which, in response to receiving estimated arrival times from a plurality of the navigation devices by the communication unit, transmits a reservation instruction to the air conditioning device via the communication unit, the reservation instruction being an instruction for setting a room temperature at the home to a predetermined target temperature by the estimated arrival time of an earliest user who is estimated to arrive at the home earliest among the users, wherein
the control device controls the air conditioning device in accordance with the reservation instruction, and
when a display device of the navigation device displays a confirmation screen for allowing the user to choose whether to cancel an activation reservation of the air conditioning device, and in response to the user's choosing to cancel the activation reservation, cancellation notification is transmitted from the navigation device, the setting unit determines the earliest user from among the users other than the user who canceled the activation reservation.

* * * * *